(12) United States Patent
Ghammam et al.

(10) Patent No.: US 11,966,094 B2
(45) Date of Patent: Apr. 23, 2024

(54) CABLE SEALING ASSEMBLY FOR AN ENCLOSURE

(71) Applicant: COMMSCOPE CONNECTIVITY BELGIUM BVBA, Kessel-Lo (BE)

(72) Inventors: El Moïz Mohammed Michel Ghammam, Brussels (BE); Philippe Coenegracht, Hasselt (BE); Bart Mattie Claessens, Hasselt (BE)

(73) Assignee: COMMSCOPE CONNECTIVITY BELGIUM BVBA, Kessel-Lo (BE)

( * ) Notice: Subject to any disclaimer, the term of this patent is extended or adjusted under 35 U.S.C. 154(b) by 281 days.

(21) Appl. No.: 17/351,510

(22) Filed: Jun. 18, 2021

(65) Prior Publication Data

US 2021/0311276 A1 Oct. 7, 2021

Related U.S. Application Data

(63) Continuation of application No. PCT/EP2019/085665, filed on Dec. 17, 2019.

(60) Provisional application No. 62/781,376, filed on Dec. 18, 2018.

(51) Int. Cl.
*H02G 15/013* (2006.01)
*F01D 11/02* (2006.01)
*G02B 6/44* (2006.01)
*H02G 15/04* (2006.01)

(52) U.S. Cl.
CPC ............ *G02B 6/4444* (2013.01); *F01D 11/02* (2013.01); *H02G 15/013* (2013.01); *H02G 15/04* (2013.01)

(58) Field of Classification Search
CPC .................................................. H02G 15/013
See application file for complete search history.

(56) References Cited

U.S. PATENT DOCUMENTS

| | | | |
|---|---|---|---|
| 4,839,471 | A | 6/1989 | Clark et al. |
| 5,155,303 | A | 10/1992 | Bensel, III et al. |
| 5,675,124 | A | 10/1997 | Stough et al. |
| 5,844,171 | A | 12/1998 | Fitzgerald |
| 6,314,229 | B1 | 11/2001 | Sasaki et al. |
| 7,927,119 | B2 | 4/2011 | Zahnen et al. |
| 8,634,688 | B2 | 1/2014 | Bryon et al. |
| 10,879,685 | B2 | 12/2020 | Claessens |
| 2021/0356690 | A1* | 11/2021 | Geens .................. H02G 15/013 |
| 2022/0285054 | A1* | 9/2022 | Massone ................ H02G 15/06 |

(Continued)

FOREIGN PATENT DOCUMENTS

| | | |
|---|---|---|
| DE | 42 17 906 A1 | 12/1993 |
| EP | 0 942 303 A1 | 9/1999 |

(Continued)

OTHER PUBLICATIONS

International Search Report and Written Opinion of the International Searching Authority for International Patent Application No. PCT/EP2019/085665 dated Mar. 18, 2020, 11 pages.

*Primary Examiner* — Hung V Ngo
(74) *Attorney, Agent, or Firm* — Merchant & Gould P.C.

(57) ABSTRACT

Sealing assembly for cable ports of a telecommunications closure. The sealing assembly includes a plurality of seal blocks that cooperate with each other to define 3-dimensional labyrinth seals around cables entering the closure through the cable ports. In some examples, the seal blocks cooperate to be self-sealing even without a cable or other structure being present.

24 Claims, 18 Drawing Sheets

(56) References Cited

U.S. PATENT DOCUMENTS

2022/0337044 A1* 10/2022 Vastmans ............ G02B 6/44775
2022/0368119 A1* 11/2022 Xiao ........................ H05K 5/03
2022/0382008 A1* 12/2022 Coenegracht ...... G02B 6/44775
2023/0072573 A1*  3/2023 Lips ........................ H02G 3/22

FOREIGN PATENT DOCUMENTS

| FR | 2 723 162 A1 | 2/1996 |
| FR | 2 823 608 A1 | 10/2002 |
| WO | 2012/088565 A1 | 7/2012 |
| WO | 2018/078127 A1 | 5/2018 |

* cited by examiner

FIG. 9
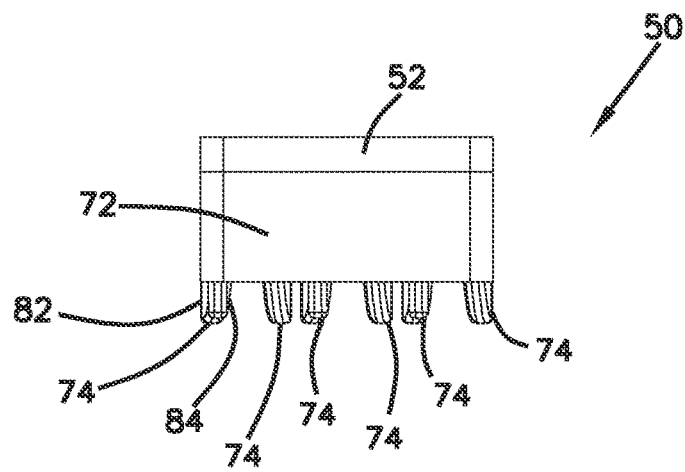
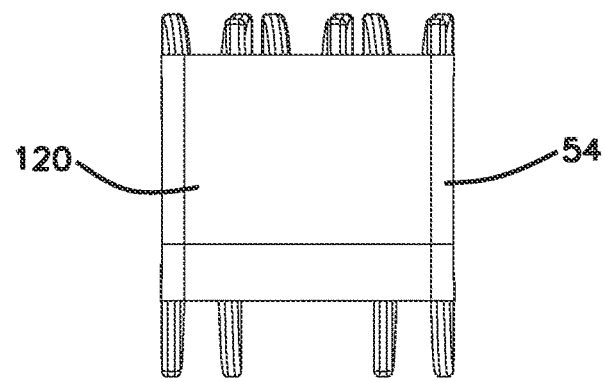
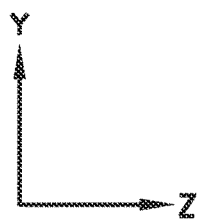
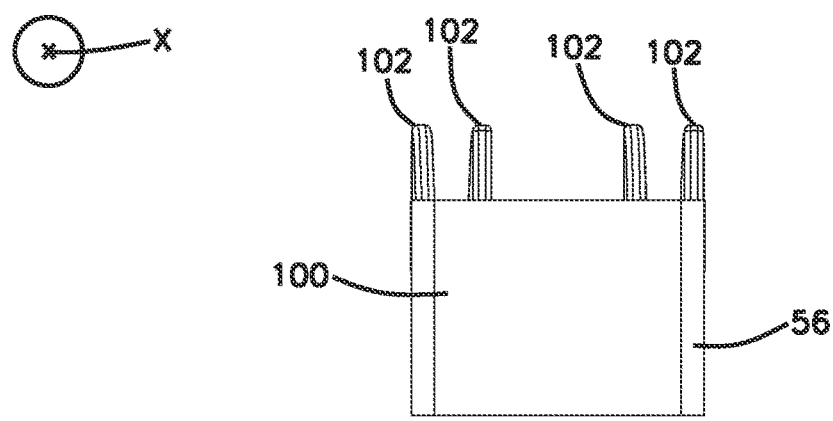

FIG. 14
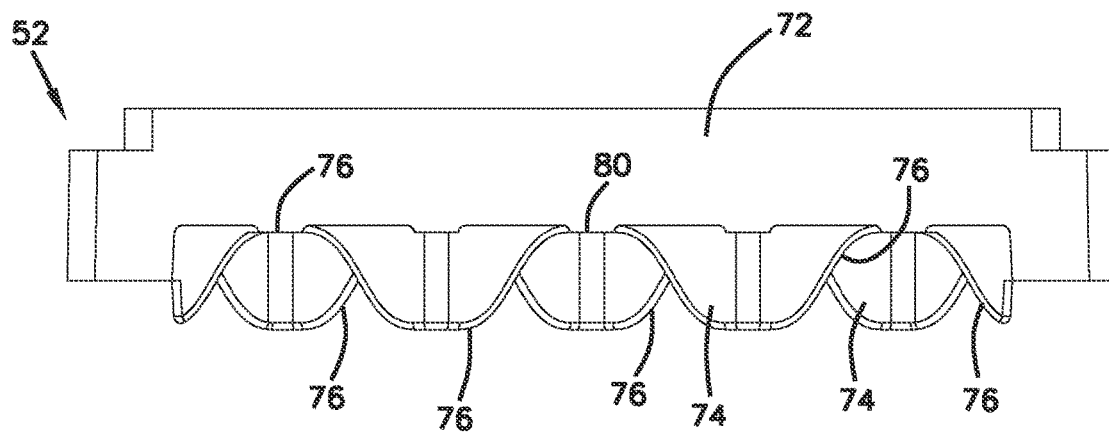
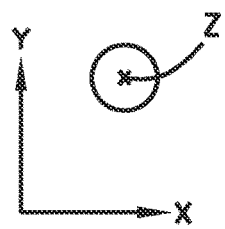
FIG. 15
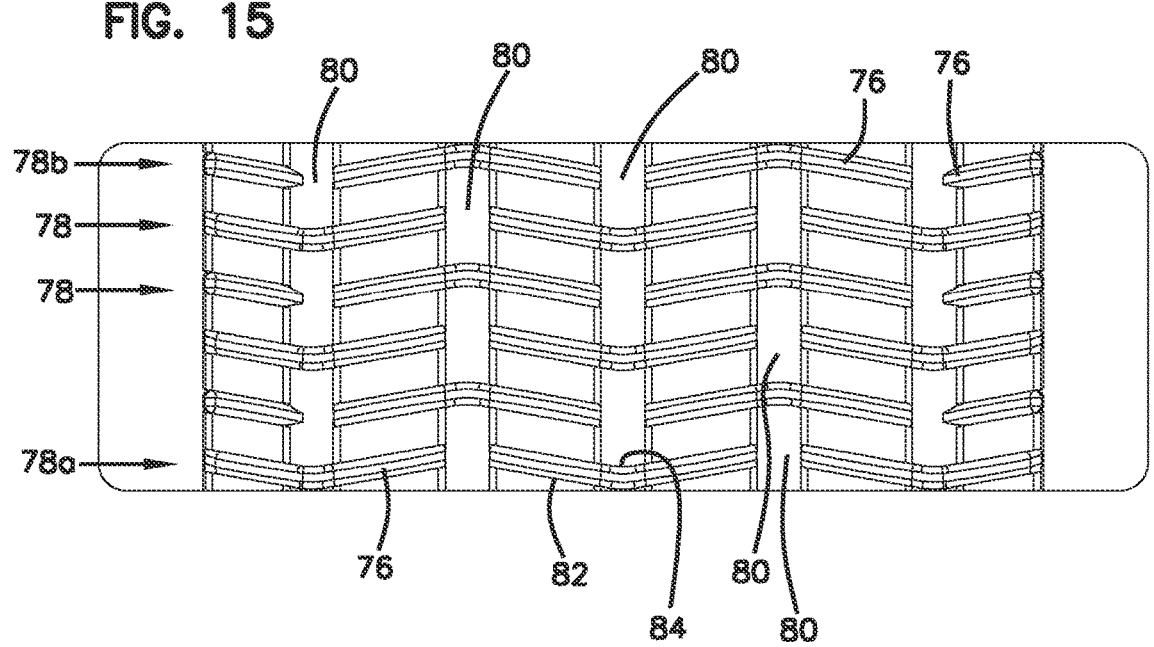
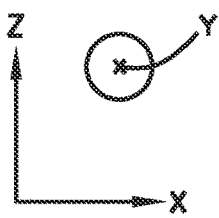

CABLE SEALING ASSEMBLY FOR AN ENCLOSURE

CROSS-REFERENCE TO RELATED APPLICATION

This application is a Continuation of PCT/EP2019/085665, filed on Dec. 17, 2019, which claims the benefit of U.S. Patent Application Ser. No. 62/781,376, filed on Dec. 18, 2018, the disclosures of which are incorporated herein by reference in their entireties. To the extent appropriate, a claim of priority to made to each of the above disclosed applications.

TECHNICAL FIELD

The present disclosure relates to sealable enclosures (also referred to as closures) for use in telecommunications and/or electrical applications, as well as cable sealing assemblies for such closures. In non-limiting examples, the sealed closures are aerial closures configured to be positioned and/or suspended above the ground.

BACKGROUND

Enclosures (e.g., telecommunications and electrical enclosures) are typically sealed to inhibit the intrusion of foreign materials such as dust and moisture. By inhibiting the intrusion of foreign materials, internal components housed within the enclosures can be protected from damage. Standards have been established for defining the levels of sealing effectiveness for enclosures. For example, International Standard EN 60529 published by the International Electrotechnical Commission (IEC) sets forth ingress protection ratings used to define levels of sealing effectiveness for enclosures. The IP code (e.g., International Protection rating or Ingress Protection rating) set forth by International Standard EN 60529 consists of the letters IP followed by two numerical digits. The numbers that follow the IP have a defined meaning. The first digit indicates the level of ingress protection provided relating to solids such as dust. The second digit indicates the level of ingress protection provided relating to liquids such as water. By way of example, an enclosure rated for ingress protection level IP 65 provides total protection from dust ingress and also provides protection from low pressure water jets. As another example, an enclosure rated for ingress protection level IP 55 provides limited protection from dust ingress and protection from low pressure water jets. As another example, an enclosure rated for ingress protection level IP 54 provides limited protection from dust ingress and protection from water spray. For certain aerial applications in certain locales, a telecommunications or electrical closure rated at IP 54, IP 55, or higher provides sufficient protection from the environment.

SUMMARY

In general terms the present disclosure relates to a cable sealing component for a telecommunications and/or electrical enclosure, the sealing component having a pair of seal blocks (or sealing blocks) that cooperate to form a seal around a cable entering the closure from outside the closure. In some examples, the seal formed is rated at IP 54 or higher. In some examples, the seal formed is rated at IP 55 or higher. In some examples, the seal formed is rated at IP 65 or higher. In at least some examples, the seal is formed regardless of the presence or absence of a cable or object within the seal.

Although specific embodiments described herein will refer to fiber optic cables carrying optical fibers, it should be appreciated that principles of the sealing components of the present disclosure can be readily applied to any form of cable or wire and a corresponding closure that requires protection from the outside environment. In addition, although specific embodiments herein will refer to aerial closures, i.e., closures that are designed to be positioned above the ground, e.g., attached to or a suspended from a telecommunications pole or an aerially suspended cable or other structure, it should be appreciated that principles of the sealing components of the present disclosure can be readily applied to closures designed for multiple applications, including indoor applications, below ground applications, and so forth. In addition, the cables shown and described herein are not meant to be limiting. The principles of the present disclosure are readily applied to many different types of cables and other elongate conduits, for example, cables carrying single fibers, multiple fibers, ribbonized fibers, etc. The cables may or may not include strength members (e.g., reinforcement rods or aramid yarn). The cables may or may not include buffer tubes surrounding the optical fibers. Typically, however, the cables do include a contaminant resistant outer jacket that protects the optical fibers (or other conduits) it carries from water, dust, and loads. In addition, the purpose and use of the closures of the present disclosure are not limited to any single purpose or use. In non-limiting examples, the closures of the present disclosure are used for splicing optical fibers and/or splitting optical fibers and/or indexing optical fibers and/or branching optical fibers from a feeder cable to drop or branch cables (or vice versa) and/or any other form of optical fiber management.

According to certain aspects of the present disclosure, there is provided a seal block assembly configured to receive and sealingly hold a cable and comprising: first and second block members, each of the first and second block members including a main body and a plurality of resilient tabs projecting from the main body, the resilient tabs defining sealing surfaces, the resilient tabs being sized and arranged such that when the first and second block members are coupled to each other: the first and second block members define a cable entry and a cable exit, a reference line extending through the cable entry and the cable exit; the sealing surfaces of the resilient tabs of the first block member abut the sealing surfaces of the resilient tabs of the second block member to form a plurality of sealing tab pairs, the sealing tab pairs being aligned along the reference line between the cable entry and the cable exit; and there is a spacing between every adjacent pair of sealing tab pairs along the reference line.

In certain examples, no cable is needed to provide a seal. That is, the seal blocks cooperate with each other to self-seal even when no cable or other object (e.g., a plug or dummy cable) is passing through the seal block assembly.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the examples disclosed herein are based.

BRIEF DESCRIPTION OF THE DRAWINGS

FIG. 9 is an exploded, side view of the cable seal block assembly of FIG. 4.

FIG. 14 is an end view of a further portion of the seal block assembly of FIG. 4.

FIG. 15 is a bottom view of the portion of a seal block assembly of FIG. 14.

DETAILED DESCRIPTION

Aspects of the present disclosure relate to closures for housing components such as telecommunication components or electrical components. The closures provide ingress protection so as to protect the internal electrical or telecommunications components from foreign materials such as dust and moisture. In certain examples, closures in accordance with the present disclosure are at least IP 65 rated, at least IP 55 rated, or at least IP 54 rated with respect to protection against ingress of dust and water.

In this disclosure sealing assemblies for closures are described. The sealing assemblies are designed to reduce and/or prevent the ingress of foreign materials into the enclosure via cable ports that communicate with the interior of the enclosure as well as the outside environment. The sealing assemblies of the present disclosure are configured to cooperate with cables passing through the sealing assemblies to create the necessary seal, and also to form seals that seal off the cable ports even in the absence of cables or other objects (such as port plugs or dummy cables). In addition, the sealing assemblies of the present disclosure are configured to provide protection against the ingress of foreign materials for cables of a variety of sizes entering the enclosure. In non-limiting examples, the sealing assemblies are configured to accommodate cables having a thickness up to about 8 mm. In non-limiting examples, the sealing assemblies are configured to accommodate cables having a thickness up to about 25 mm, or more.

Figure 1:
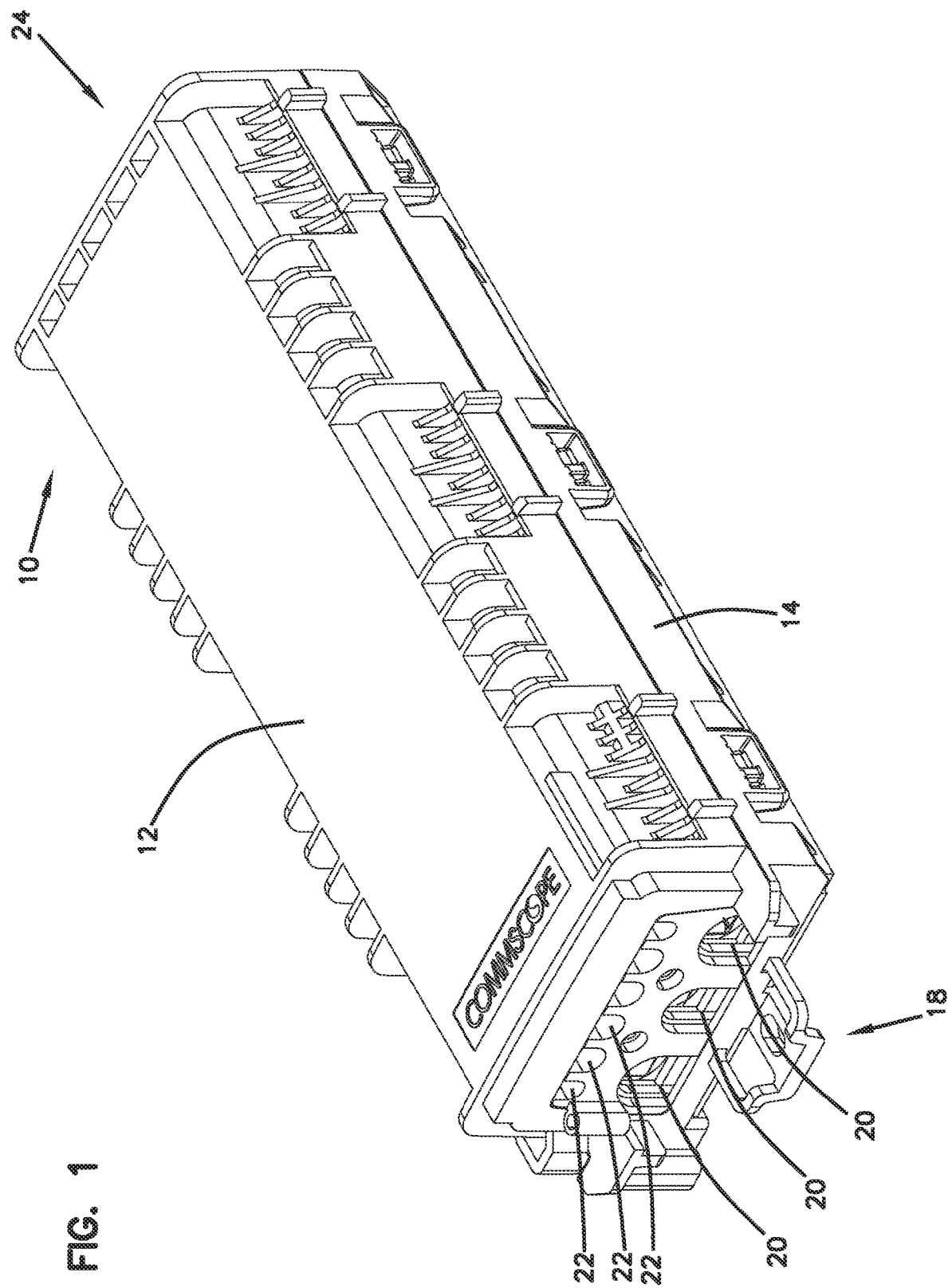
FIG. 1 is a perspective view of an example telecommunications closure including a sealing component in accordance with the present disclosure.
Figure 2:
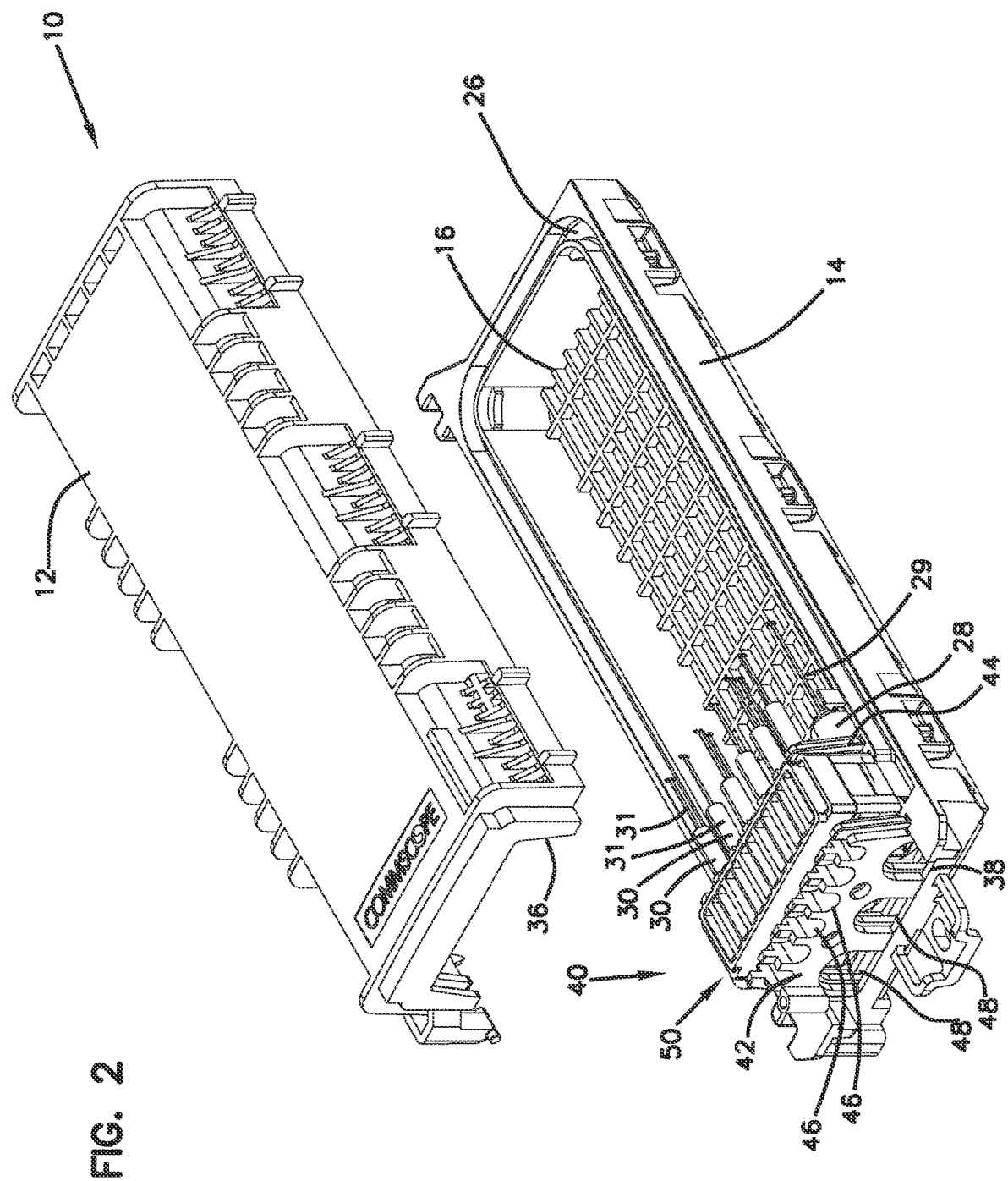
FIG. 2 is a partially exploded perspective view of the closure of FIG. 1.
Figure 3:
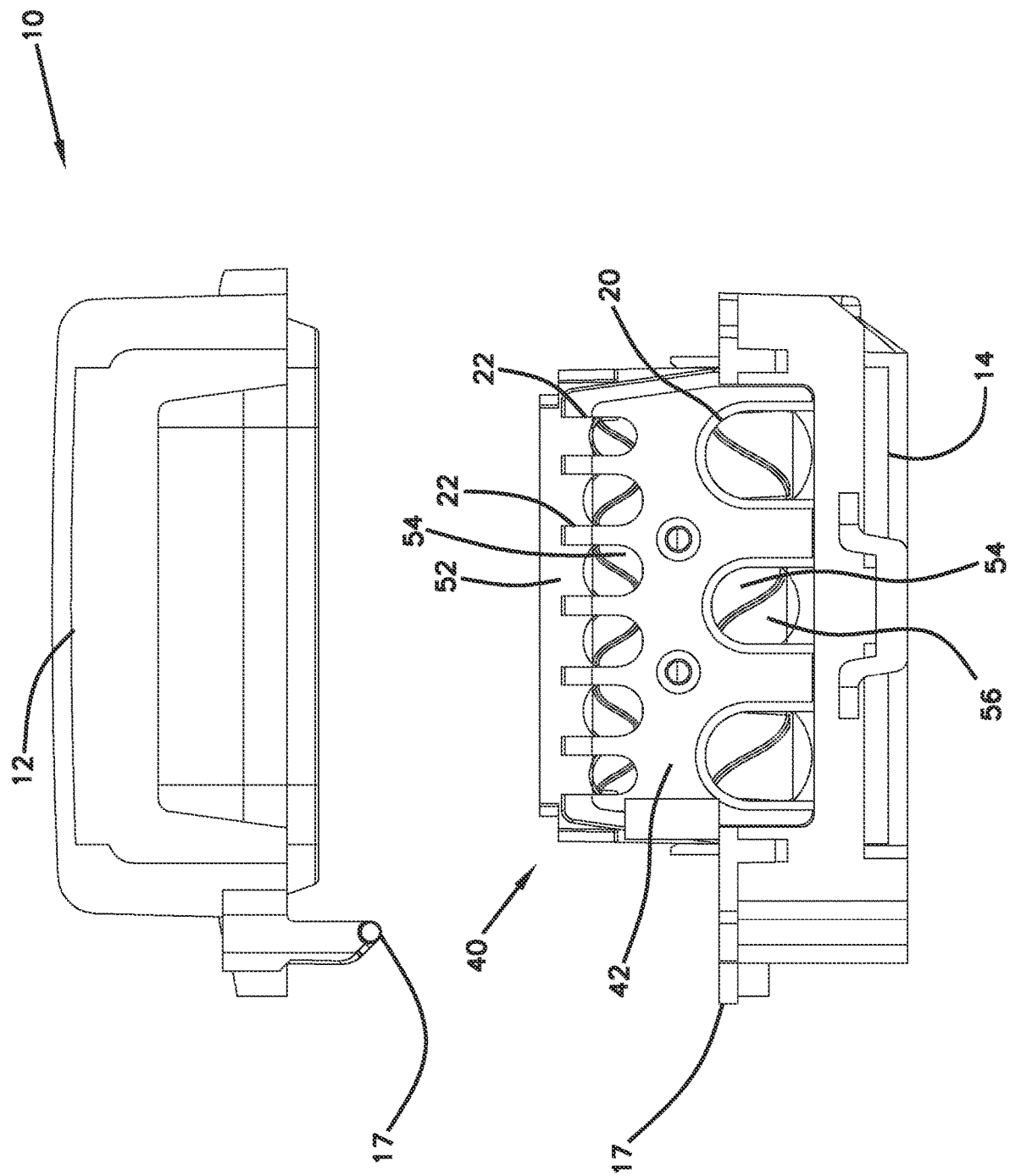
FIG. 3 is a partially exploded end view of the closure of FIG. 1.

Referring to FIGS. 1-3, an example closure 10 is a telecommunications closure configured for aerial mounting applications. The closure 10 includes housing pieces 12 and 14 that cooperate to define an interior closure volume 16. The housing pieces 12 and 14 are hingedly coupled to each other by hinges 17, such that the closure is re-enterable and re-closable by pivoting the housing pieces 12 and 14 away from each other and towards each other about the hinges 17. The closure volume 16 can support various components for optical fiber management, such as splices, splitters, multiplexors, fiber organizing trays, components that take up fiber slack (e.g., spooling structures), connectors, adaptors, and/or panels that receive connectors and/or adapters for providing active and/or passive fiber optic connections, and so forth.

Optical fibers 29 from feeder cables 28 enter the closure volume through the feeder cable ports 20. Those optical fibers 29 are managed in the closure volume 16 and routed to fibers 31 of drop or branch cables 30 which exit the closure volume 16 via the drop cable ports 22. For example, the feeder cables 28 branch off from a main cable (not shown) routed from a network provider, while the drop cables 30 are routed to different network subscriber locations. The cables 28 and 30 and fibers 29 and 31 are axially truncated in FIGS. 1-3 for ease of illustration. The example closure 10 is a butt configuration, meaning that the feeder cable ports 20 and drop cable ports 22 are positioned at the same end 18 of the closure 10, with the opposite end 24 not defining any cable ports. In other examples, the closure can be an inline closure or other configuration, where the drop cable ports and feeder cable ports are positioned at different ends (e.g., opposite ends) or sides of the closure from each other.

The sealing of the cables and cable ports will be described in greater detail below. In addition to those seals, the closure 10 includes a perimeter seal that creates sealing interfaces between the two housing pieces 12 and 14 where the two housing pieces meet when the closure 10 is closed. In this example, the perimeter seal includes a perimeter seal member (not shown), e.g., a compressible or deformable gel strip, that is positioned in a perimeter sealing groove 26 of the housing piece 14. The perimeter seal member is compressed and/or deformed by the housing piece 12 when the two housing pieces are brought together, forming a seal around a majority of the perimeter of the closure 10.

A sealing component 40 is positioned at the cable entry end 18 of the closure 10. A sealing element holding area 36, 38 is defined by the two housing pieces 12, 14 such that the sealing component 40 is securely held by the closure 10 when the closure is closed. In some examples the holding area 36, 38 includes one or more ribs or grooves adapted to cooperate with complementary features of the sealing component 40 to provide for a secure holding of the sealing component 40 by the closure 10. The holding area 36, 38, also provides access for cables to enter the cable ports 20, 22.

Figure 4:
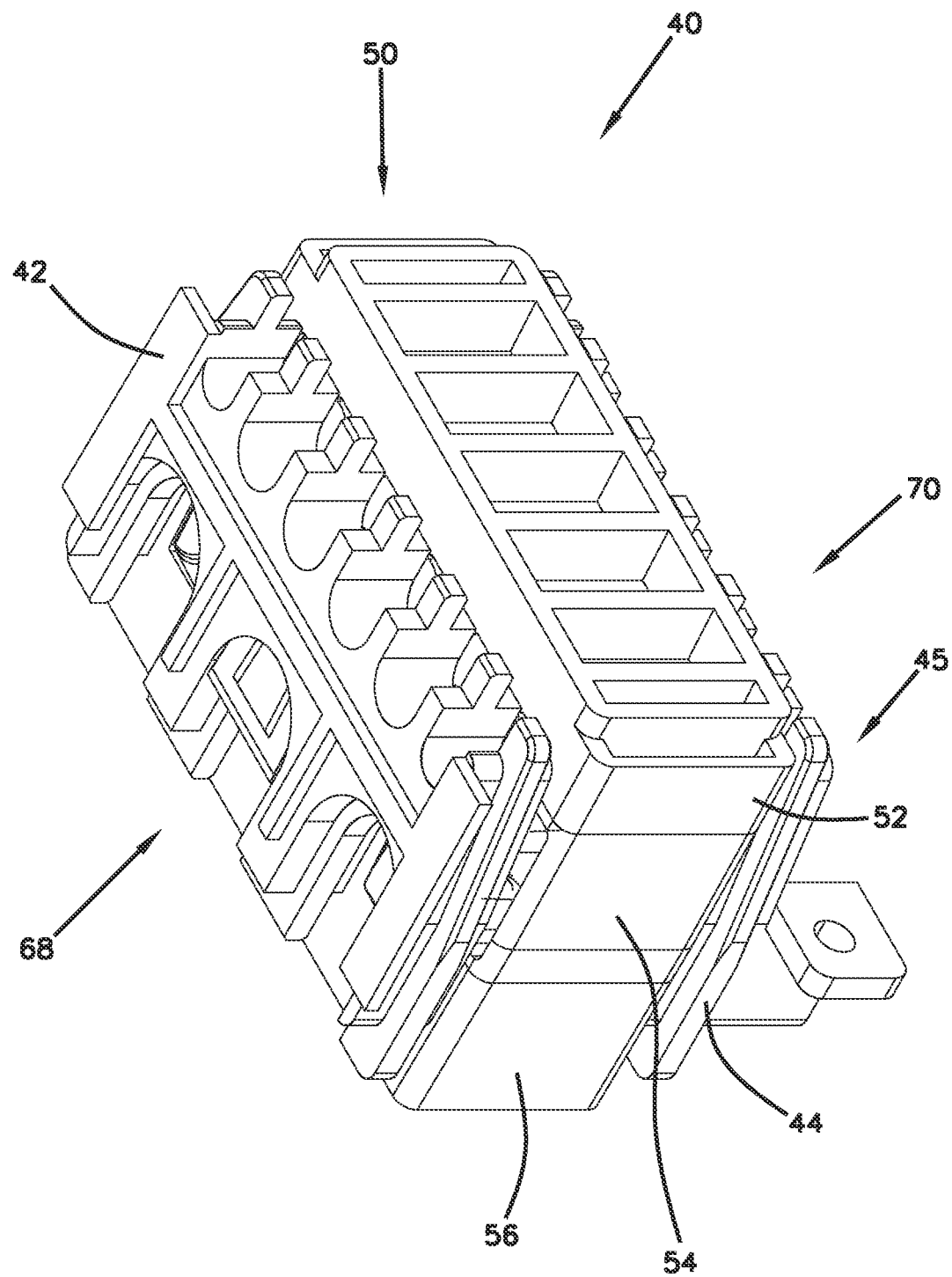
FIG. 4 is a perspective view of the cable seal block assembly of the closure of FIG. 1, including a support frame.

Referring to FIG. 4, the sealing component 40 includes an outer rigid plate 42 and an inner rigid plate 44 that define openings for receiving the feeder cables and the drop cables therethrough. More specifically, the drop cable openings 46 defined by the outer plate 42 axially align (along axes of the drop cables that enter the closure with corresponding feeder cable openings defined by the inner plate 44, and the feeder cable openings 48 defined by the outer plate 42 axially align (along axes of the feeder cables that enter the closure 10) with corresponding feeder cable openings defined by the inner plate 44.

Positioned between the outer and inner rigid plates 42, 44 is a sealing assembly (or seal block assembly) 50. The sealing assembly includes at least two seal blocks that cooperate with each other to form seals. In the example assembly 50, the assembly 50 includes three seal blocks, including a middle seal block 54 that cooperates and intermeshes with each of a feeder cable seal block 56 and a drop cable seal block 52.

Figure 5:
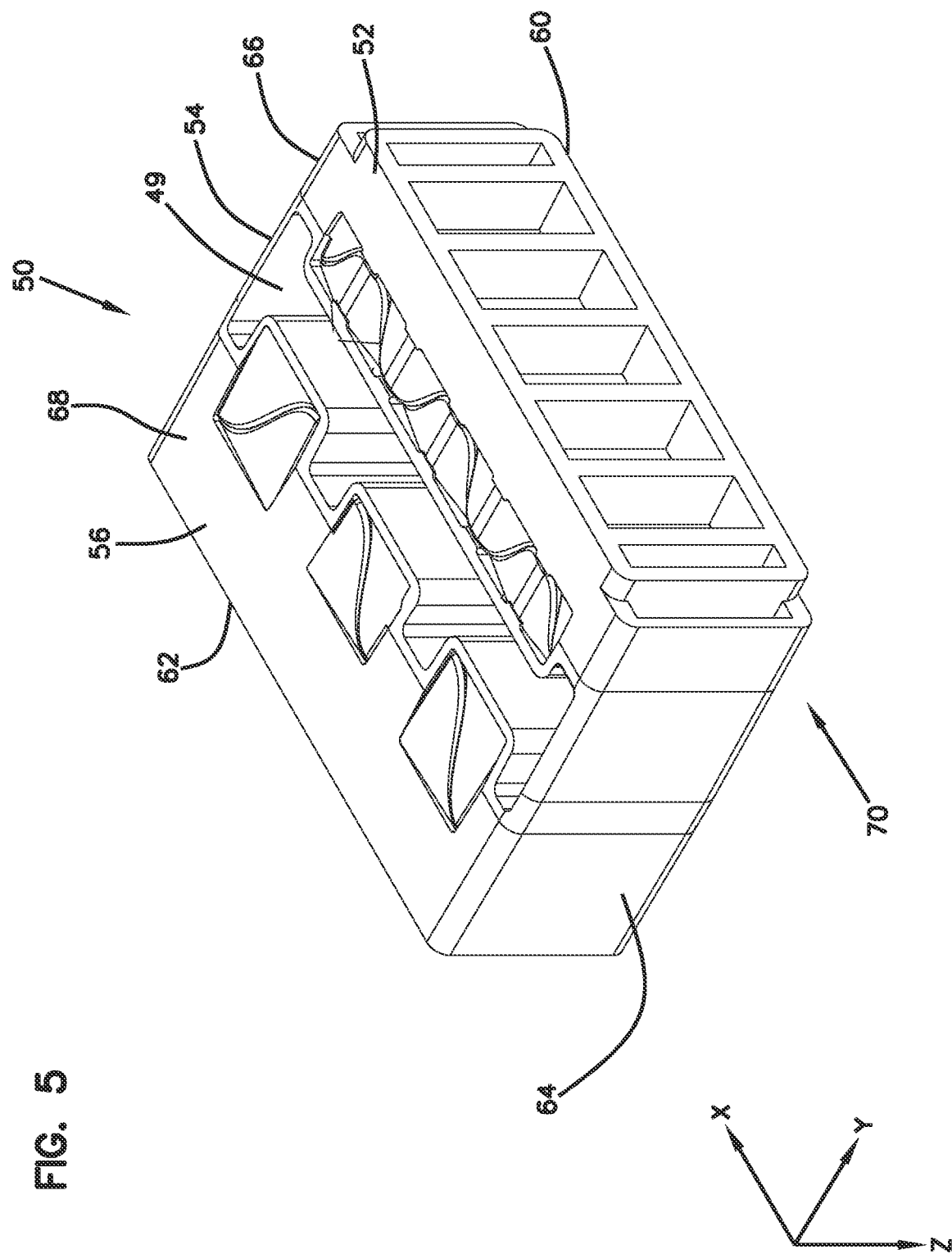
FIG. 5. is a perspective view of the cable seal block assembly of FIG. 4.
Figure 6:
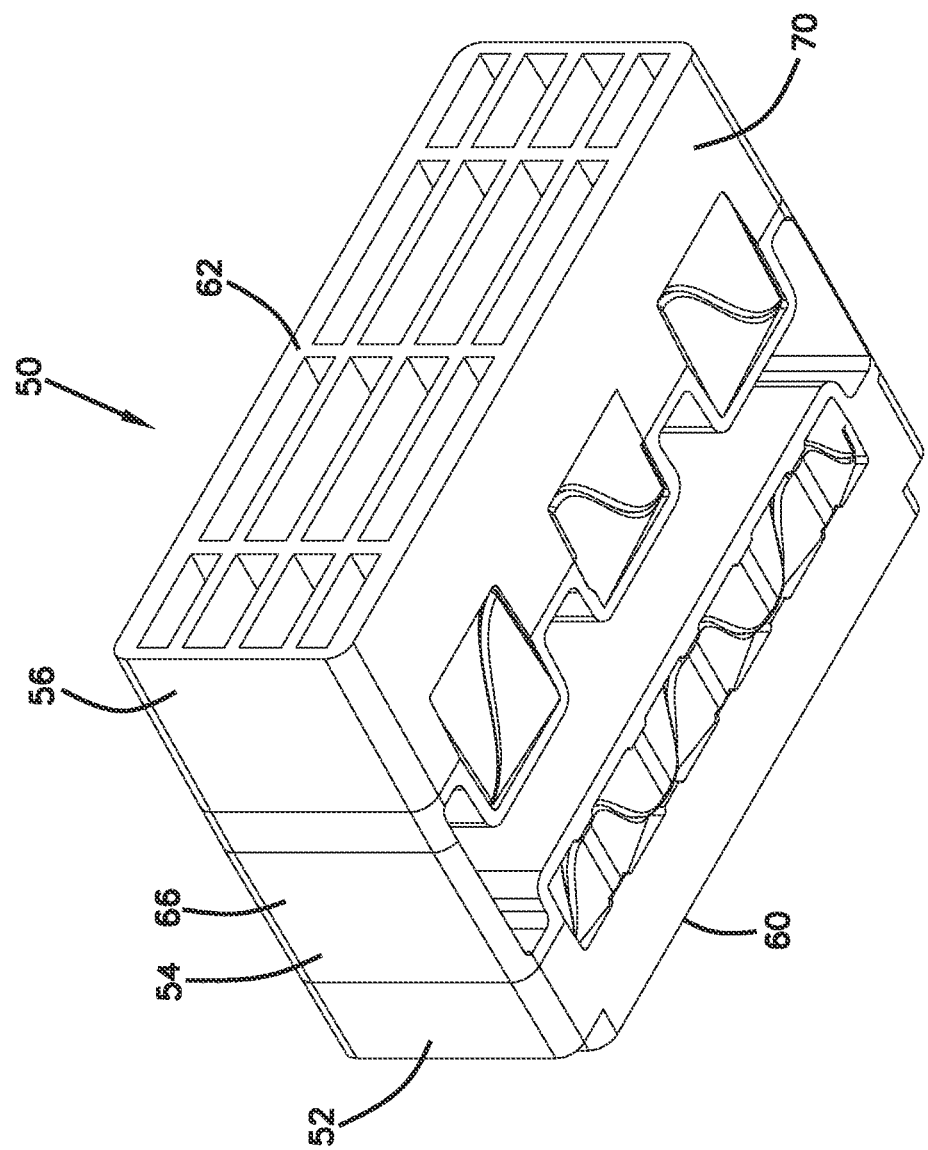
FIG. 6 is a further perspective view of the cable seal block assembly of FIG. 4.
Figure 7:
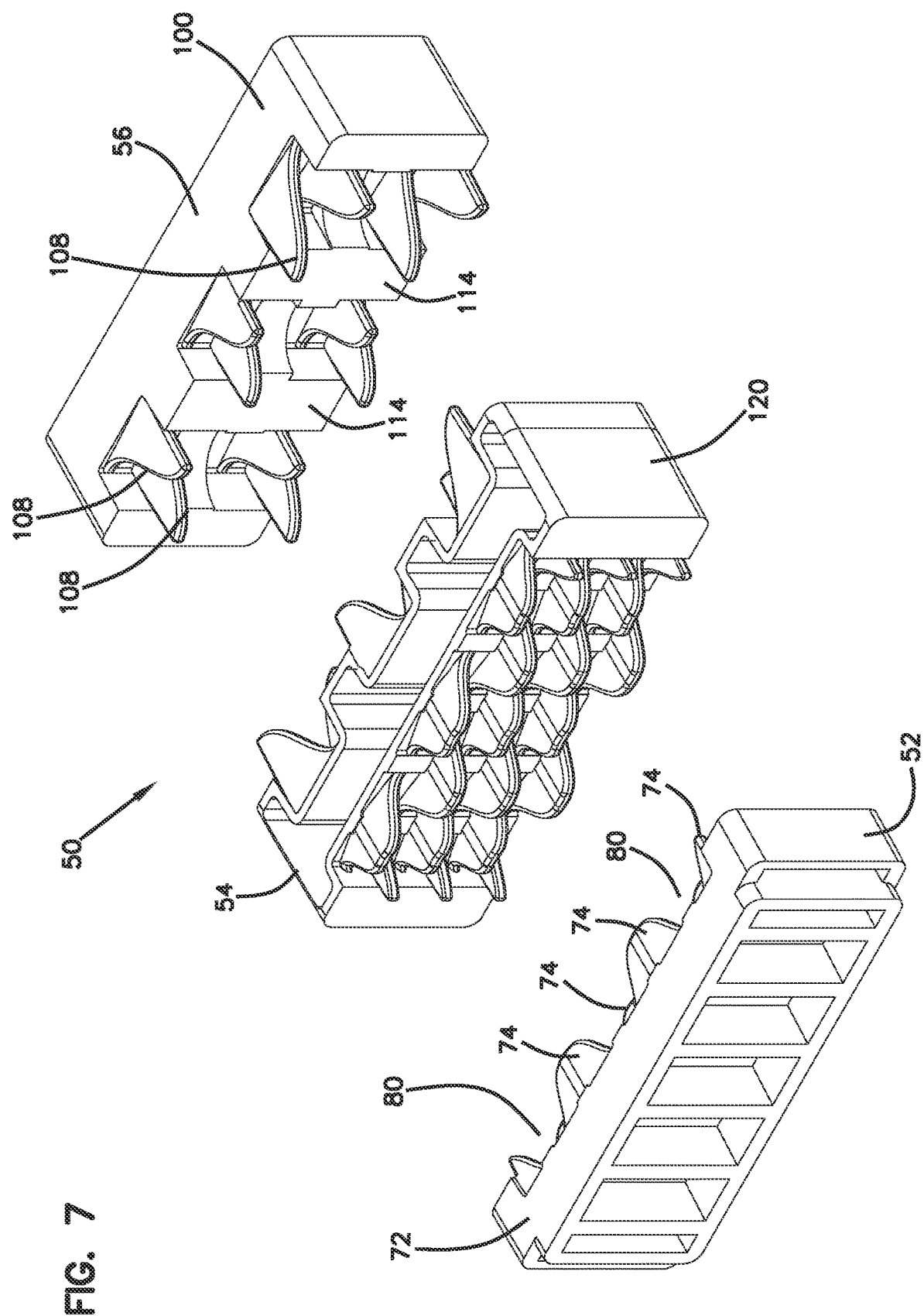
FIG. 7 is an exploded, perspective view of the cable seal block assembly of FIG. 4.
Figure 8:
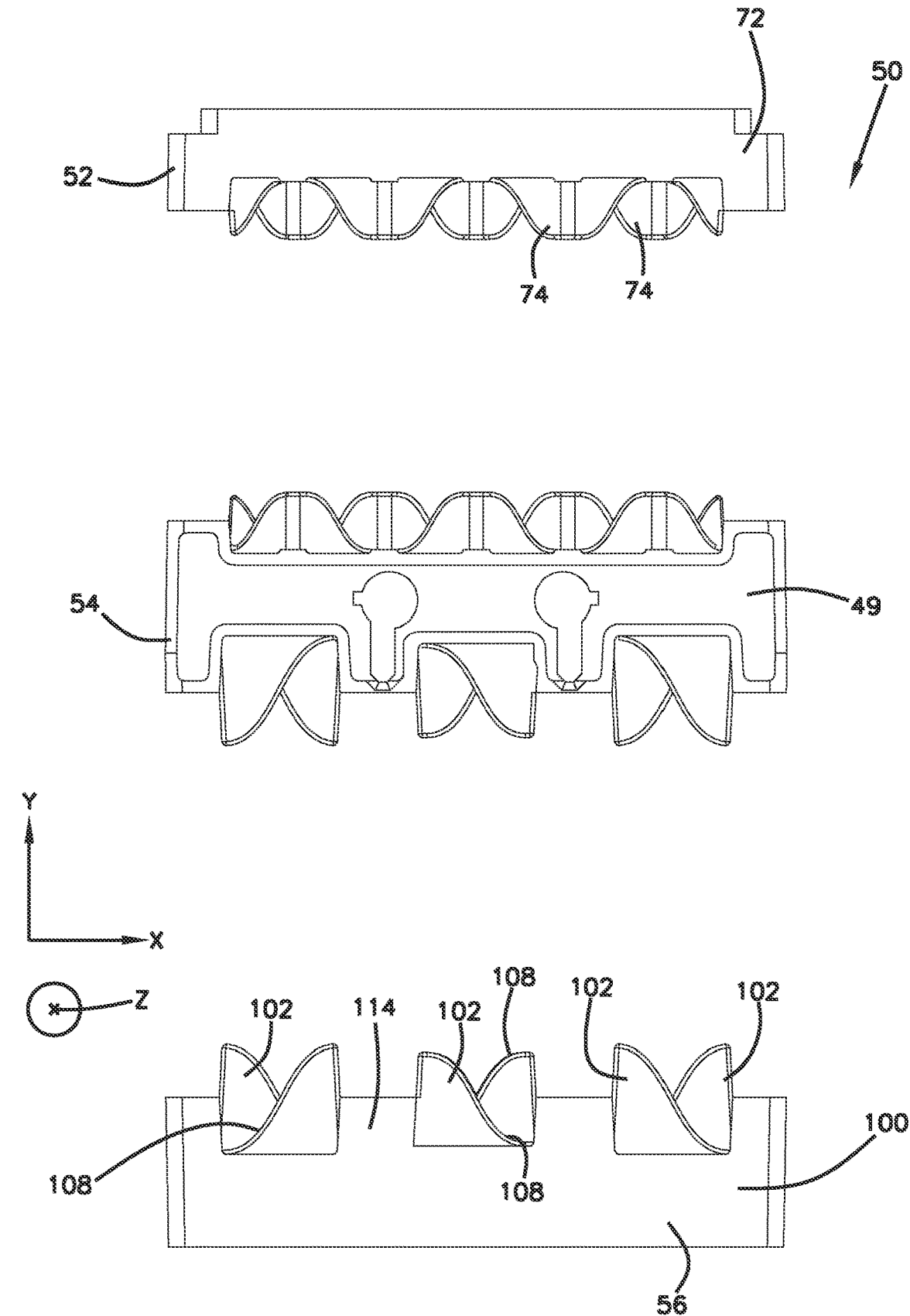
FIG. 8 is an exploded, end view of the cable seal block assembly of FIG. 4.
Figure 10:
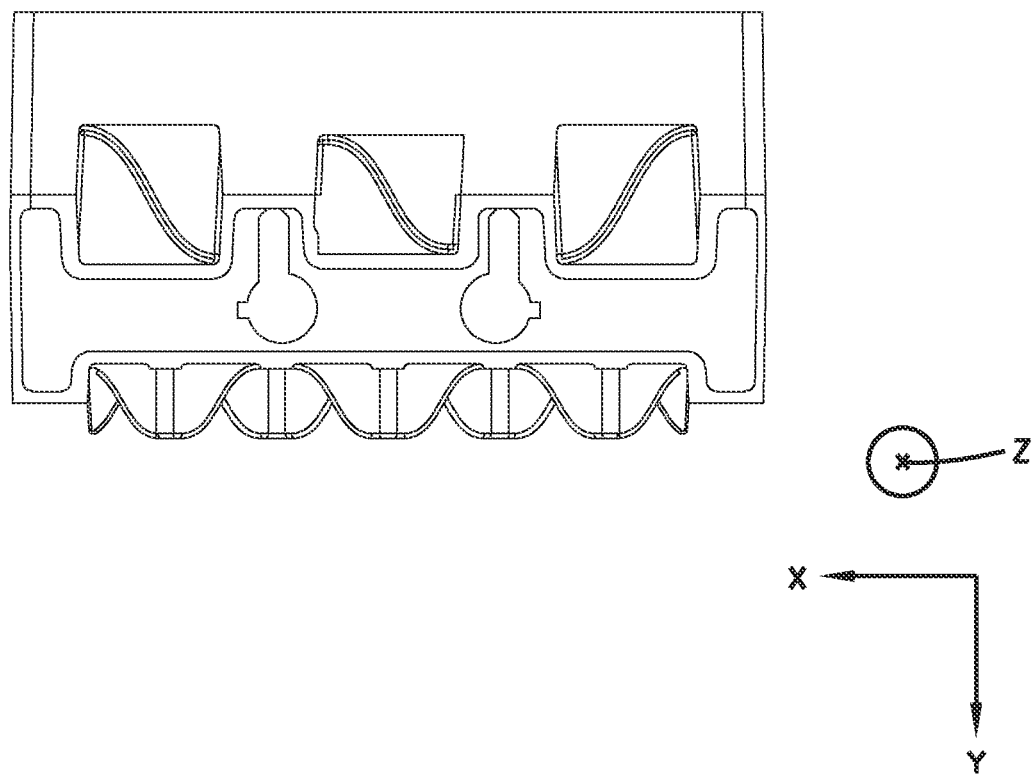
FIG. 10 is an end view of a portion of the cable seal block assembly of FIG. 4.
Figure 11:
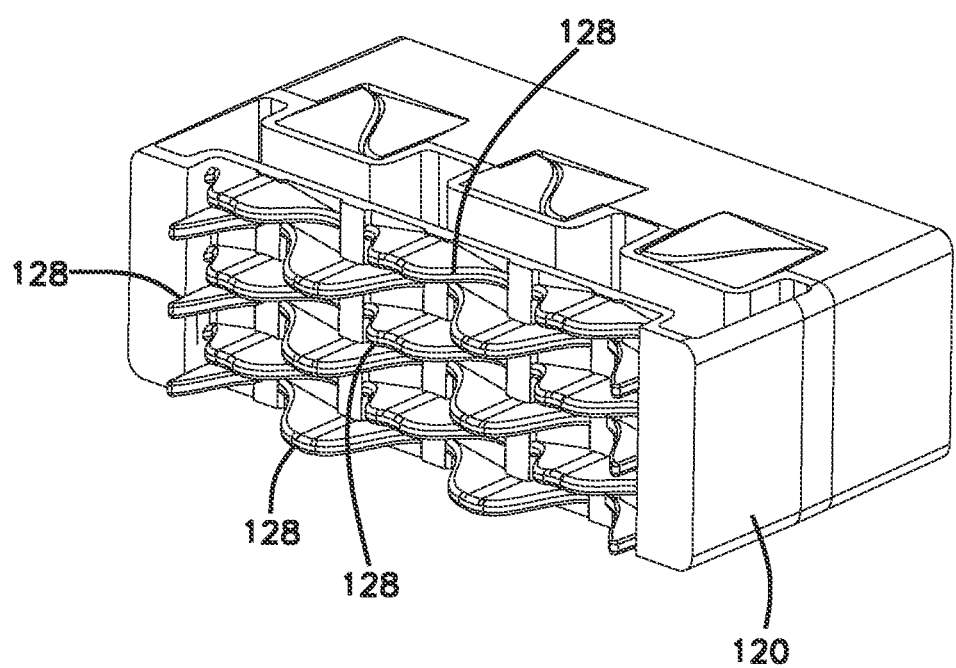
FIG. 11 is a perspective view of the portion of the cable seal block assembly of FIG. 10.
Figure 12:
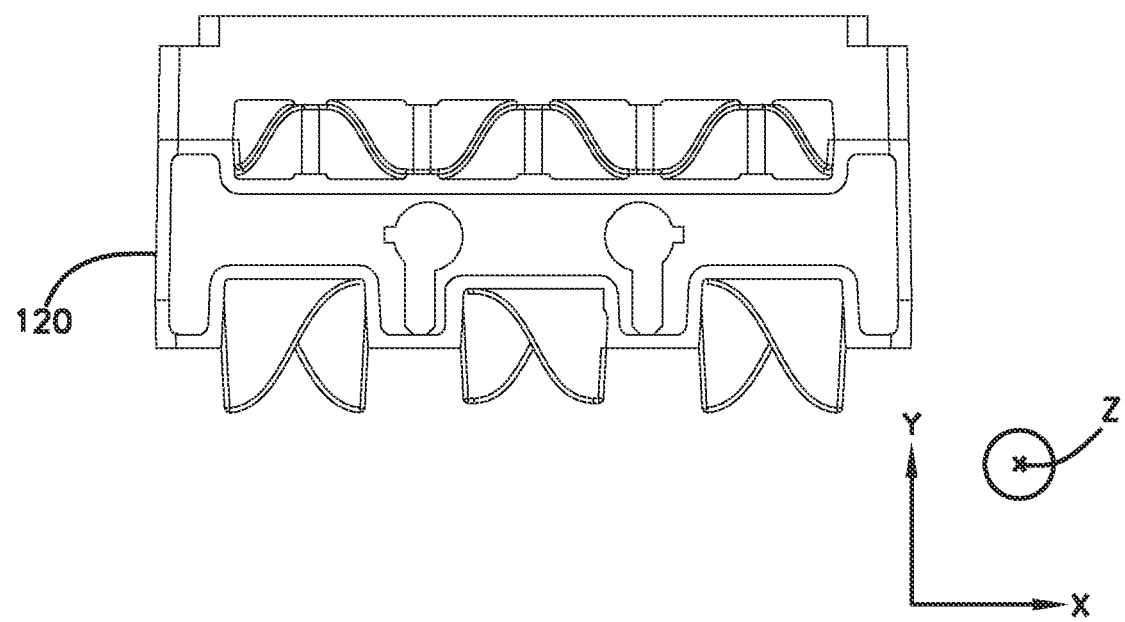
FIG. 12 is an end view of a further portion of the cable seal block assembly of FIG. 4.
Figure 13:
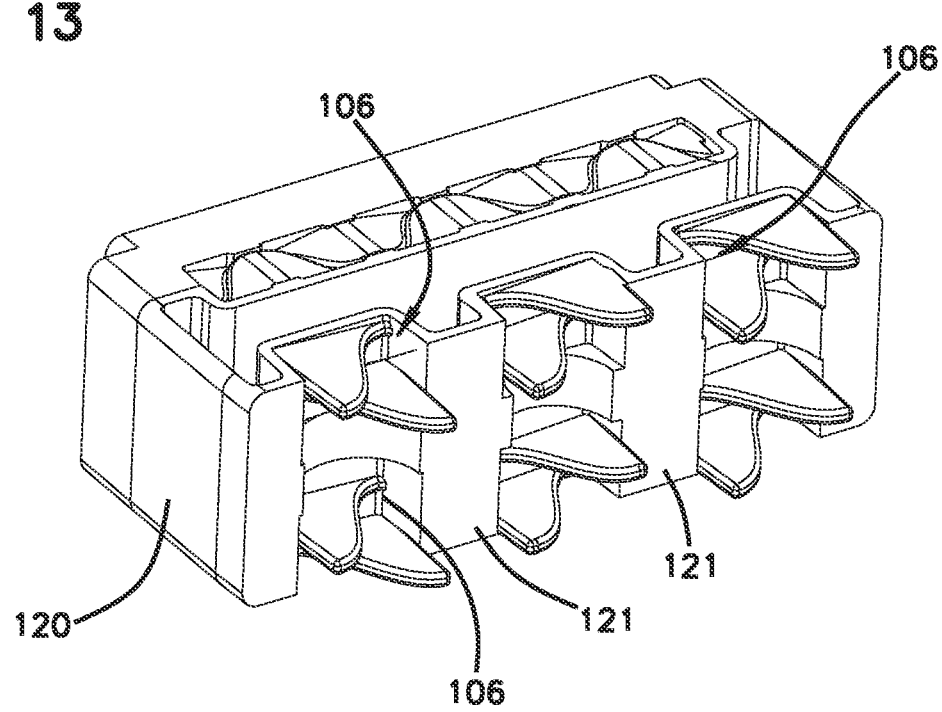
FIG. 13 is a perspective view of the portion of the cable seal block assembly of FIG. 12.

In some examples, the middle seal block 54 is mounted and secured to outer and inner rigid plates 42 and 44. Referring to FIG. 4, in some examples, one or more rigid support branches extend between the outer and inner rigid 42, 44 forming a support frame 45. For example, such branches can be received in a support branch receiving area 49 (FIGS. 5, 8) defined by the middle seal block 54. The support frame holds and supports the middle seal block 54, with the branches of the frame 45 extending through the middle seal block from the outer rigid plate 42 to the inner rigid plate 44 (though the support branch receiving area 49), and through the middle seal block 54 to thereby securely couple and support the middle seal block 54 on the frame 45.

In some examples, each of the seal blocks 52, 54, 56, including all of the seal blocks features, is an integrally molded part. In other examples, portions of a seal block are molded separately and then attached, e.g., with adhesive, to form the seal block. In at least some examples, the seal blocks 52, 54, 56 are made from an elastomeric material such as, but not limited to, silicone, or rubber. In some examples, the seal blocks are made from silicone having a durometer of between about 20 to about Shore A. In some examples, the silicone has a durometer of about 25 Shore A.

Referring now to FIGS. 5-20, the sealing assembly 50 will be described in greater detail. To aid description, reference will be made to a three dimensional coordinate system having mutually perpendicular x, y, and z axes. The sealing assembly extends parallel to the y axis between a top 60 and a bottom 62, parallel to the x axis between a first side 64 and a second side 66, and parallel to the z axis between a front end 68 and a rear end 70. Terms such as top, bottom, front, rear, and side are used for description purposes only and placing of features relative to other features. Such terms do not limit how the sealing assembly is used or positioned relative to another object, such as a closure, the ground, etc.

The drop cable seal block 52 includes a main body 72 and a plurality of resilient tabs 74 projecting downwards from the main body 72. The resilient tabs 74 are provided in a plurality of rows 78 extending substantially parallel to the x axis. The rows 78 of tabs 74 define gaps 80 alternating with the tabs 74 in each row. The rows 78 of tabs 74 and gaps 80 also define sealing surfaces 76. In some examples, the sealing surfaces face one direction. In some examples, such as shown in FIG. 15, the sealing surfaces 76 face multiple directions, e.g., define a non-straight line as projected in a y-z plane.

In this example, as shown in FIGS. 14-15, the resilient tabs 74 in adjacent pairs of the rows 78 are offset from each other such that, from front to back, i.e., parallel to the z axis, a tab 74 of one row is aligned with a gap 80 of the adjacent row. The resilient tabs 74, their sealing surfaces 76, and the gaps 80 are complementarily sized and arranged to cooperate with tabs and gaps of the middle seal block 54 to provide a seal. In particular, when the drop cable seal block 52 and middle seal block 54 are coupled together, resilient tabs of the middle seal block 54 fill the gaps the tabs 74 fill corresponding gaps of the middle seal block 54, and sealing surfaces defined by the tabs and gaps of the middle seal block 54 abut the sealing surfaces 76 defined by the resilient tabs 74 and gaps 80 of the drop cable seal block 52.

Each of the resilient tabs 74 has a front side 82 and a rear side 84, where one of the front side 82 and the rear side 84 is concave and the other is correspondingly convex. The overall convexity or concavity of each tab 74 faces towards the front (i.e., faces a direction parallel to the negative z direction), or the back (i.e., faces a direction parallel to the positive z direction) of the seal block 52, with the concavity/convexity alternately reversing from a row 78 to another row 78 along the z direction. The concavity and convexity can be defined by smooth continuous curvatures as projected in an x-z plane, or alternatively by a discontinuous curvature (e.g., a partially trapezoidal shape) as projected in an x-z plane.

The tabs 74 of each row 78 all of have the same direction of concavity. In at least some examples, such as the embodiment depicted, the front-most row 78a of tabs 74 are concave towards the rear of the seal block 52, and the rear-most row 78 of tabs 74 are concave towards the front of the seal block 52 (FIG. 15).

The concavity and convexity of the resilient tabs 74 results in a preferred direction of deformation in an x-z plane of the tabs 74 when a cable is introduced. In particular, a tab 74 that has an overall concavity facing the rear of the seal block 52 (i.e., a concavity defined by the negative z direction) is urged to increase in concavity towards the rear of the seal block 52 when the cable is introduced, while a tab 74 that has an overall concavity facing the front of the seal block 52 (i.e., a concavity defined by the positive z direction is urged to increase in concavity towards the front of the seal block 52 when the cable is introduced).

From front to rear of the seal block 52, the direction of concavity/convexity of the tabs 74 in adjacent rows 78 alternates. That is, the front most row 78 of tabs 74 are concave facing the rear of the seal block 52, and the immediately adjacent row 78 of tabs 74 are concave facing the front of the seal block (FIG. 15). Thus, tabs 74 of adjacent rows 78 are urged to deform in opposite directions relative to each other when a cable is introduced.

In some examples, there is an odd number of rows 78 of tabs 74. In other examples, as depicted, there is an even number (6) of rows 78 of tabs 74. In some examples, there are at least 2, at least 3, at least 4, at least 5, at least 6, at least 7, at least 8, or more rows 78. Each row 78 includes at least one of the tabs 74. In some examples, each row includes 2, 3, 4, 5, or more of the tabs 74. The rows 78 can be evenly or non-evenly spaced from front to back.

In each row 78, the sealing surface 76 has an undulating configuration as projected in an x-y plane. For example, the sealing surface 76 of each row of tabs 74 defines a path projected in an x-y plane having a sinusoidal, substantially sinusoidal (e.g., flattened sinusoidal), trapezoidal or substantially trapezoidal (e.g., trapezoidal with rounded vertices) configuration when projected in an x-y plane, alternating between peaks and troughs, a peak corresponding to a bottom-most point of a tab 72 and a trough corresponding to a top-most point of a gap 80.

In addition, due to the concavity/convexity of the tabs 72 as described above, in each row 78 the sealing surface 76 has an undulating configuration in an x-z plane. For example, the sealing surface 76 has a sinusoidal, substantially sinusoidal, trapezoidal or substantially trapezoidal (e.g., trapezoidal with rounded vertices) configuration when projected in an x-z plane, alternating between peaks and troughs, the peaks and troughs corresponding to centers of concavity/convexity of the tabs 72 and gaps 80.

In addition, the configurations of the sealing surfaces 76 of adjacent rows 78 as projected in an x-y plane are out of phase with each other (FIG. 14). In at least some examples, the configuration of sealing surfaces 76 of adjacent rows 78 are, as projected in an x-y plane, about 90° out of phase with each other. That is, the curve formed by the peaks and troughs of the sealing surface 76 projected in an x-y plane of a given row 78 of tabs 74 is 90° offset (or out of phase) from the curve formed by the peaks and troughs of the sealing surface 76 as projected in an x-y plane of an adjacent row 78.

In other embodiments, the phase difference is greater than 0° and less than 90°, e.g., in a range from about 30° to about 89°, or in a range from about 30° to about 60°.

Figure 17:
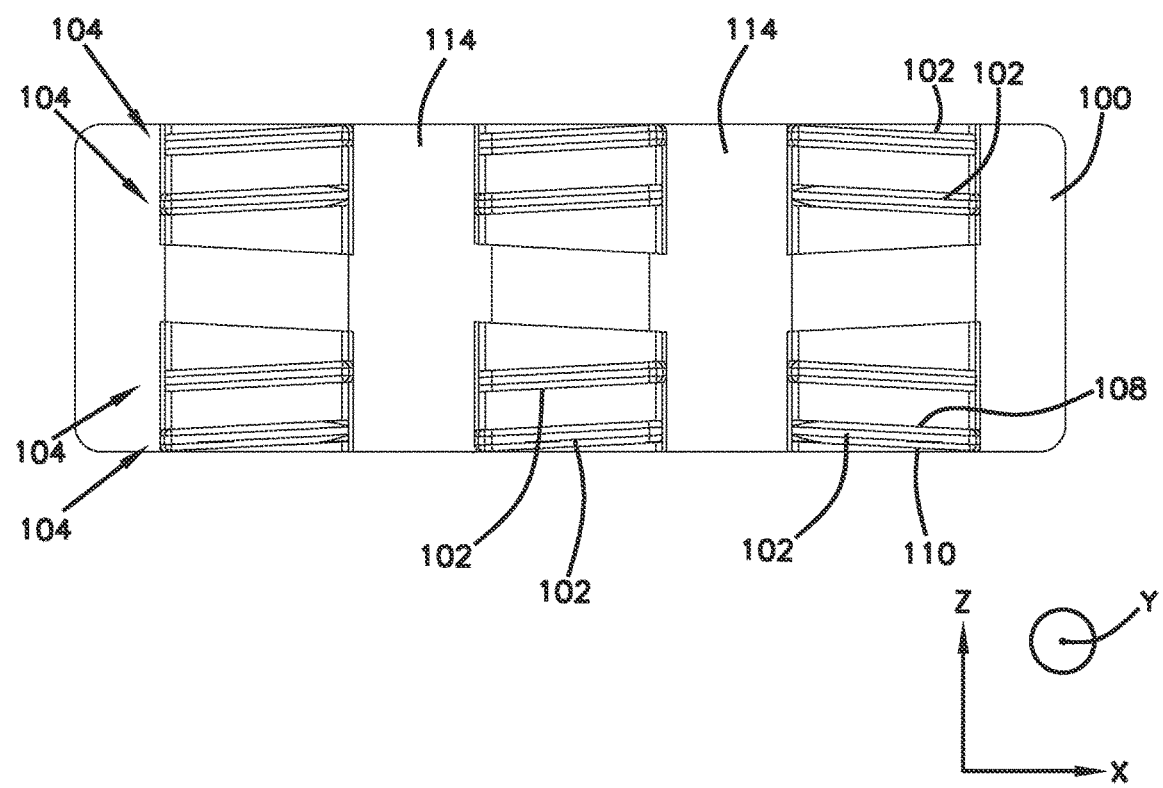
FIG. 17 is a top view of the portion of the seal block assembly of FIG. 16.
Figure 18:
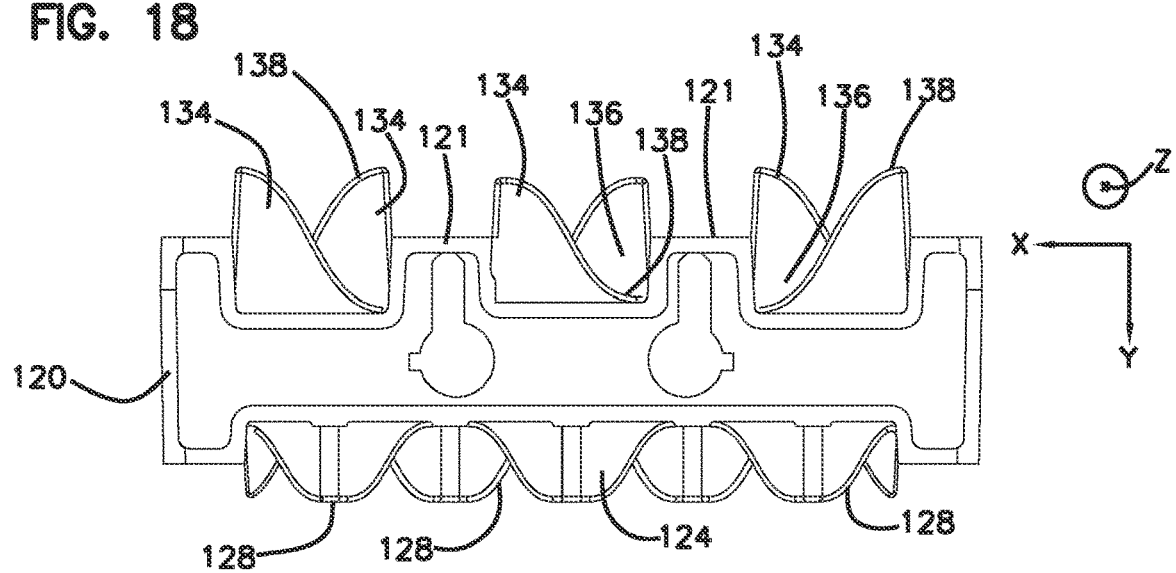
FIG. 18 is an end view of a further portion of the seal block assembly of FIG. 4.
Figure 19:
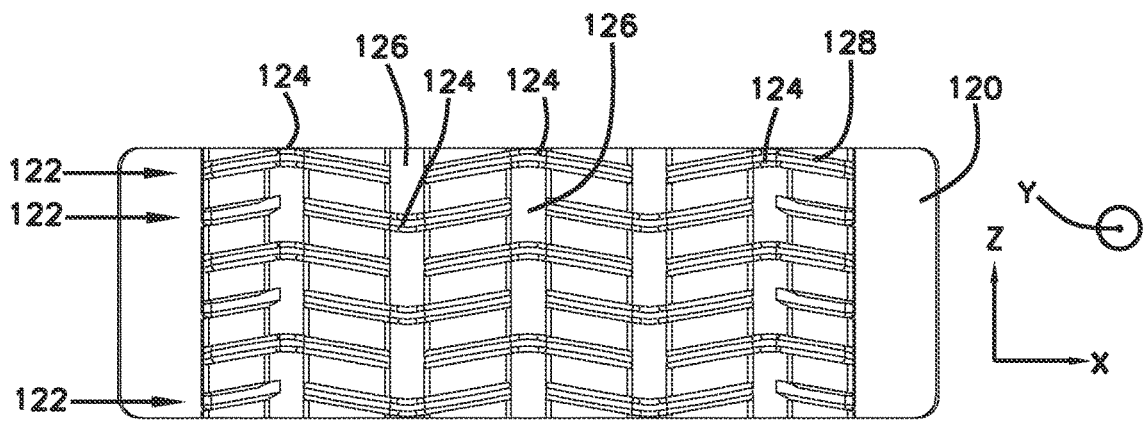
FIG. 19 is a top view of the portion of the seal block assembly of FIG. 18.
Figure 20:
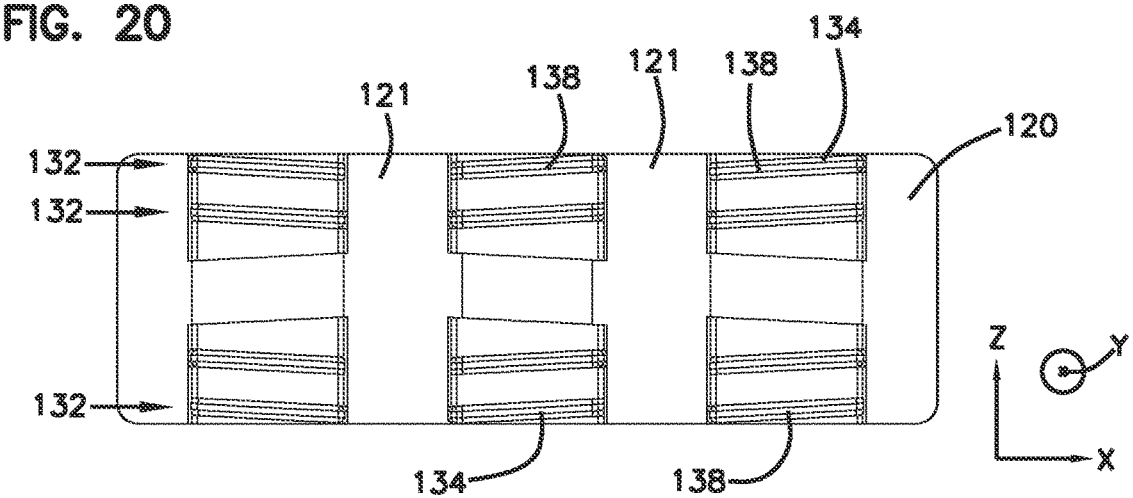
FIG. 20 is a bottom view of the portion of the seal block assembly of FIG. 18.

The feeder cable seal block 56 includes a main body 100 and a plurality of resilient tabs 102 projecting upwards (i.e., in the positive y direction) from the main body 100. The resilient tabs 102 are provided in a plurality of rows 104 extending substantially parallel to the x-axis (FIG. 17). The rows 104 of tabs 102 define gaps 106 alternating with the tabs 102 in each row. The rows 104 of tabs 102 and gaps 106 also define sealing surfaces 108. In some examples, the sealing surfaces face one direction. In some examples, such as shown in FIG. 17, the sealing surfaces 76 face multiple directions, e.g., define a non-straight line as projected in a y-z plane.

The resilient tabs 102 in adjacent pairs of the rows 104 are offset from each other such that, from front to back (i.e., parallel to the z axis), a tab 102 of one row is aligned with a gap 106 of the adjacent row. The resilient tabs 102, their sealing surfaces 108, and the gaps 106 are complementarily sized and arranged to cooperate with tabs and gaps of the middle seal block 54 to provide a seal. In particular, when the feeder cable seal block 56 and middle seal block 54 are coupled together, resilient tabs of the middle seal block 54 fill the gaps 106, the tabs 102 fill corresponding gaps of the middle seal block 54, and sealing surfaces defined by the tabs and gaps of the middle seal block 54 abut the sealing surfaces 108 defined by resilient tabs 102 and gaps 106 of the feeder cable seal block 56.

Each of the resilient tabs 102 has a non-zero pitch relative to the z axis (FIG. 17). In particular, each of the resilient tabs 102 has a front side 108 and a rear side 110, where one of the front side 108 and the rear side 110 partially faces (i.e., is pitched towards) along a positive x-direction, and the other of the front side 108 and the rear side 110 partially faces (i.e., is pitched towards) the negative x-direction.

The pitch of the resilient tabs 102 results in a preferred direction of deformation of the tabs 102 when a cable is introduced.

In some examples, there is an odd number of rows 104 of tabs 102. In other examples there is an even number of rows 104 of tabs 102. In some examples, there are at least 2, at least 3, at least 4, at least 5, at least 6, at least 7, or more rows 104. Each row 104 includes it lease one of the tabs 102. In some examples, each row includes 2, 3, 4, 5, or more of the tabs 102. The rows 104 can be evenly or non-evenly spaced from front to back (i.e., in a direction parallel to the z axis).

Figure 16:
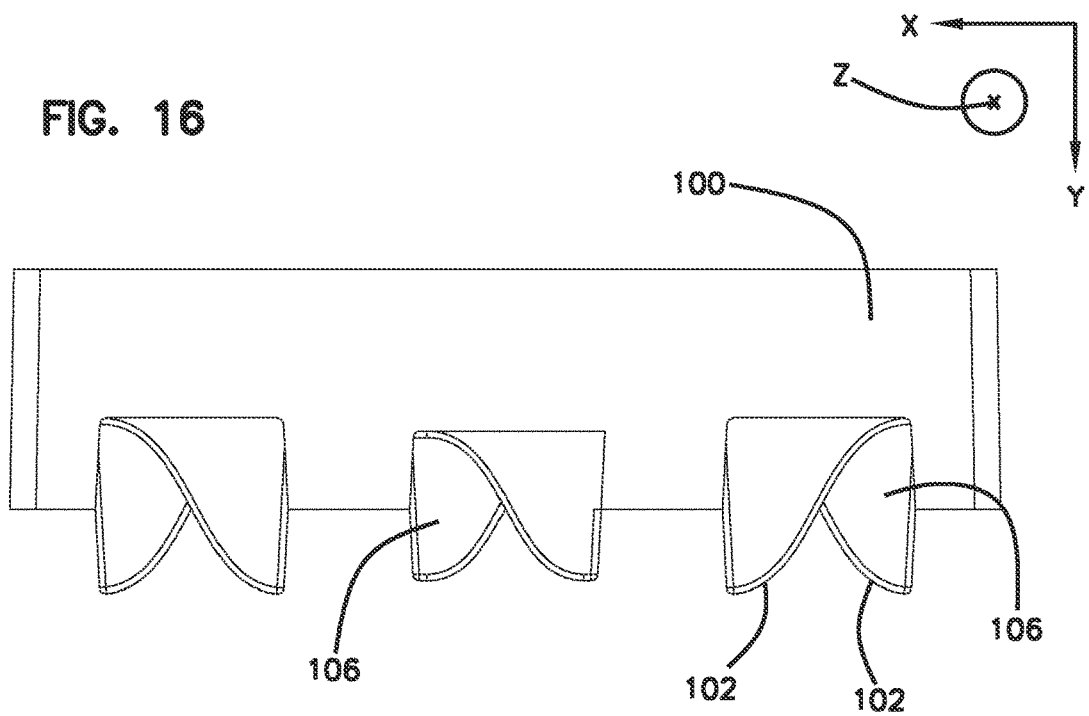
FIG. 16 is an end view of a further portion of the seal block assembly of FIG. 4.

In each row 104, the sealing surface 108 has undulating portions as projected in an x-y plane (FIG. 16). For example, the sealing surface 108 defines a path projected in an x-y plane having portions that are sinusoidal, substantially sinusoidal, trapezoidal or substantially trapezoidal (e.g., trapezoidal with rounded vertices), alternating between peaks and troughs, a peak corresponding to a top-most point of a tab 102 and a trough corresponding to a bottom-most point of a gap 106.

The undulating portions of sealing surfaces 108 of adjacent rows 104 are out of phase with each other as projected in an x-y plane (FIGS. 16-17). In at least some examples, the undulating portions of the sealing surfaces 108 of adjacent rows 104 are about 90° out of phase with each other as projected in an x-y plane. That is, the curve projected into an x-y plane the by the peaks and troughs of the sealing surface 108 of a given row 104 of tabs 102 is 90° offset (or out of phase) from the curve formed by the peaks and troughs of the sealing surface 108 of an adjacent row 104.

In other embodiments the phase difference is greater than 0° and less than 90°, e.g. in a range from about 30° to about 89°, or in a range from about 30° to about 60°.

Optionally, one or more ribs 114 protruding from the main body 100 in the positive y direction are positioned between adjacent pairs of tabs 102 in a given row 104. The ribs 114 can provide structural support to the tabs 102, and particularly for tabs subject to significant deformation by relatively thick cables.

The middle seal block 54 includes a main body 120. In this example, the middle seal block 54 is a unitary structure configured to cooperate both with the drop cable seal block 52 and the feeder cable seal block 56, such that the assembly 50 includes three seal blocks. It should be appreciated that only two seal blocks are required to create a seal. Thus, for example, in alternative examples, the seal block assembly includes just two seal blocks, including, e.g., the drop cable seal block 52, and the cooperating portion of the middle seal block 54.

Extending in the positive y direction from the main body 120 are rows 122 (FIG. 19) of resilient tabs 124 and alternating gaps 126 defining sealing surfaces 128. The sealing surfaces 128 are adapted to cooperate with and abut the sealing surfaces 76 of the drop cable seal block 52 when the seal blocks 52 and 54 are coupled together. The resilient tabs 124, rows 122, and gaps 126 have the same structural configuration and properties as the tabs 74, rows 78, and gaps 80, respectively, as described above.

Extending in the negative y direction from the main body 120 are rows 132 (FIG. 20) of resilient tabs 134 and alternating gaps 136 defining sealing surfaces 138. The sealing surfaces 138 are adapted to cooperate with and abut the sealing surfaces 108 of the feeder cable seal block 56 when the seal blocks 56 and 54 are coupled together. The resilient tabs 134, rows 132, and gaps 136 have the same structural configuration and properties as the tabs 102, rows 104, and gaps 106, respectively, as described above. Optionally, one or more ribs 121 protruding from the main body 120 in the negative y direction are positioned between adjacent pairs of tabs 134 in a given row 132. The ribs 121 are positioned to align and cooperate with the ribs 114 in a y-z plane, and can provide structural support to the tabs 134, and particularly for tabs subject to substantial deformation by the introduction of relatively thick cables.

Cooperation of the seal blocks 52 and 54 and the seal blocks 54 and 56 to form seals will now be described with reference to FIGS. 21-23.

Figure 22:
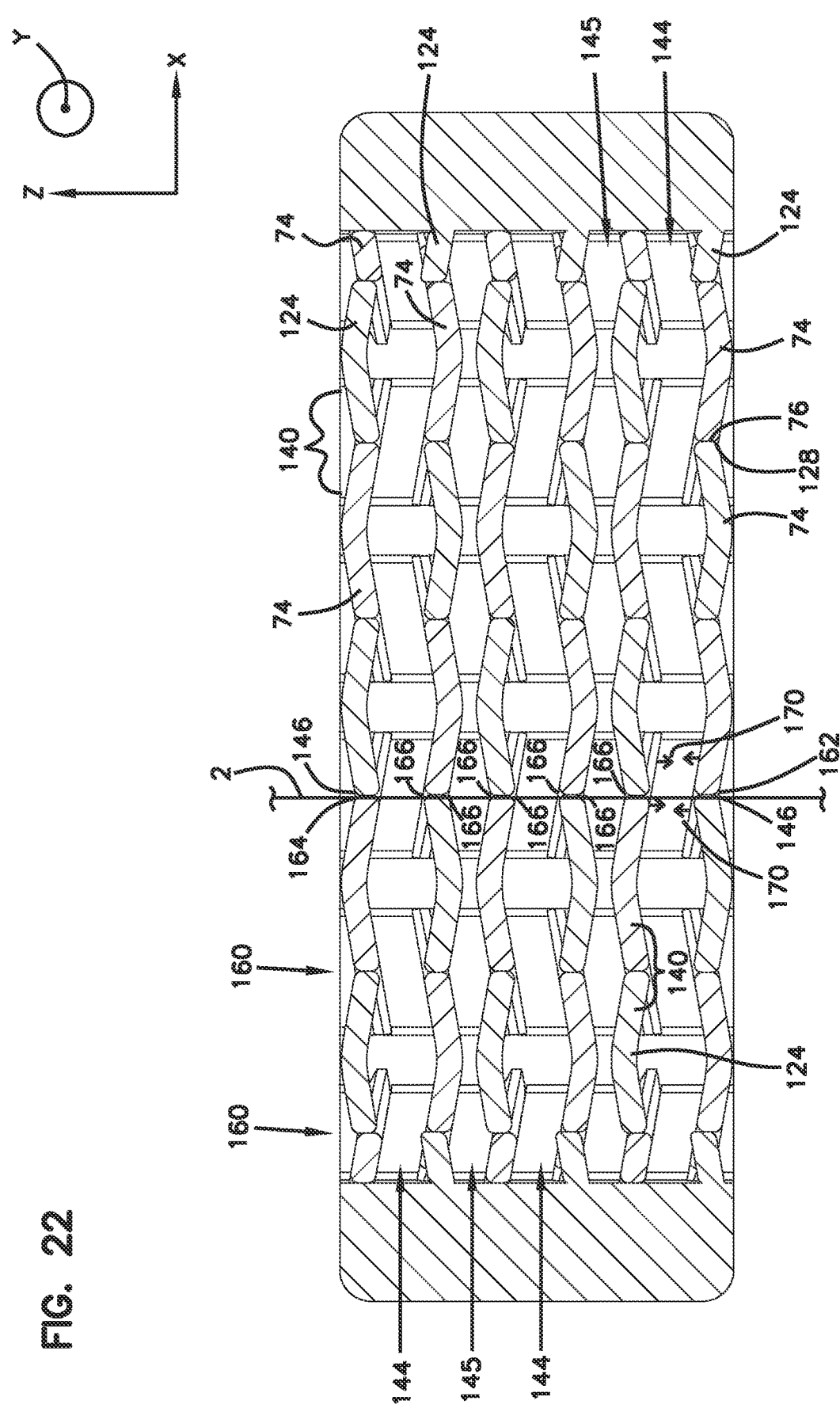
FIG. 22 is a cross-sectional view of the seal block assembly of FIG. 4 taken along the line 22-22 in FIG. 21, and also including a drop cable.

When the seal blocks 52 and 54 are coupled together, in some examples, the sealing surfaces 76 and 128 press against each other (FIG. 22). Similarly, when the seal blocks 56 and 54 are coupled together, in some examples, the sealing surfaces 138 and 108 press against each other (FIG. 23). In some examples, the pressing force between sealing surfaces 128 and 76 and/or 138 and 108 is sufficient to cause a slight deformation in the abutting tabs.

The seal blocks 52 and 54 are configured such that when they are coupled to each other, the tabs 74 and gaps 80 intermesh, respectively, with the gaps 126 and tabs 124 such that no spacing is formed between the sealing surfaces 128 and 76. In this manner, the seal blocks 52 and 54 are self-sealing in that a seal is provided via the abutment of the surfaces 128 and 76 without the need to insert a cable or other object (e.g., a dummy cable or plug) into the seal blocks. Similarly, the blocks 56 and 54 are configured such that when they are coupled to each other, the tabs 102 and gaps 106 intermesh with the gaps 136 and tabs 134 such that no spacing is formed between the sealing surfaces 138 and 108. In this manner, the seal blocks 56 and 54 are self-sealing in that a seal is provided via the abutment of the surfaces 138 and 108 without the need to insert a cable or other object (e.g., a dummy cable or plug) in the seal blocks.

With the seal blocks 52 and 54 coupled together, the tabs 74 abut the tabs 124, forming sealing tab pairs 140. Each sealing tab pair 140 includes a tab 74 and a tab 102 that abut each other at their sealing surfaces 76, 128.

The seal interface 146 between a sealing surface 76 and a sealing surface 128 of a sealing tab pair 140 projects in an x-y plane as a curve with a first slope polarity (positive or negative). Due to the phase difference in sealing surfaces 76, 128 between adjacent rows 78 of tabs 74, and between adjacent rows 122 of tabs 124, the polarity of the slope of the curve projected in an x-y plane from interfaces 146 of adjacent sealing tab pairs 140 are opposite each other, the slope polarity of the interfaces 146 alternating (between positive and negative) from tab pair 140 to tab pair 140 along a direction parallel to the z axis.

In addition, along a direction parallel to the z axis, spacings (FIG. 22) alternate with sealing tab pairs 140, such that there is a relatively large spacing 144 between each pair of adjacent sealing tab pairs 140 made of tabs having facing concavities along a direction parallel to the z axis, and there is a relatively small spacing 145 between each of adjacent sealing tab pairs 140 made of tabs having facing convexities along a direction parallel to the z axis. In some examples, the spacings 144, 145 are large enough (parallel to the z axis) such that when the adjacent tabs deflect upon the introduction of a cable, the adjacent tabs do not touch each other, thereby providing a more robust seal around the cable.

With the seal blocks 56 and 54 coupled together, the tabs 102 abut the tabs 134, forming sealing tab pairs 150. Each sealing tab pair 150 includes a tab 102 and a tab 134 that abut each other at their sealing surfaces 108, 138.

The interface 156 between a sealing surface 108 and a sealing surface 138 of a sealing tab pair 150 projects in an x-y plane as a curve with a first slope polarity (positive or negative). Due to the phase difference in sealing surfaces 108, 138 between adjacent rows 104 of tabs 102, and between adjacent rows 132 of tabs 134, the polarity of the slope of the curve projected in an x-y plane from interfaces 156 of adjacent sealing tab pairs 150 are opposite each other, the slope polarity of the interfaces 156 alternating (between positive and negative) from tab pair 150 to tab pair 150 along a direction parallel to the z axis.

In addition, along a direction parallel to the z axis, spacings 154 (FIG. 23) alternate with sealing tab pairs 150, such that there is a spacing 154 between each pair of adjacent sealing tab pairs 150 along a direction parallel to the z axis.

With the seal blocks 52 and 54 coupled together, cable passages 160 (FIG. 22) extending substantially parallel to the z axis are defined. In this example, 6 parallel cable passages 160 are defined, such that coupling of seal blocks 52 and 54 can accommodate and provide sealing for up to 6 (i.e., 0, 1, 2, 3, 4, 5 or 6) cables, assuming one cable per passage 160.

Figure 21:
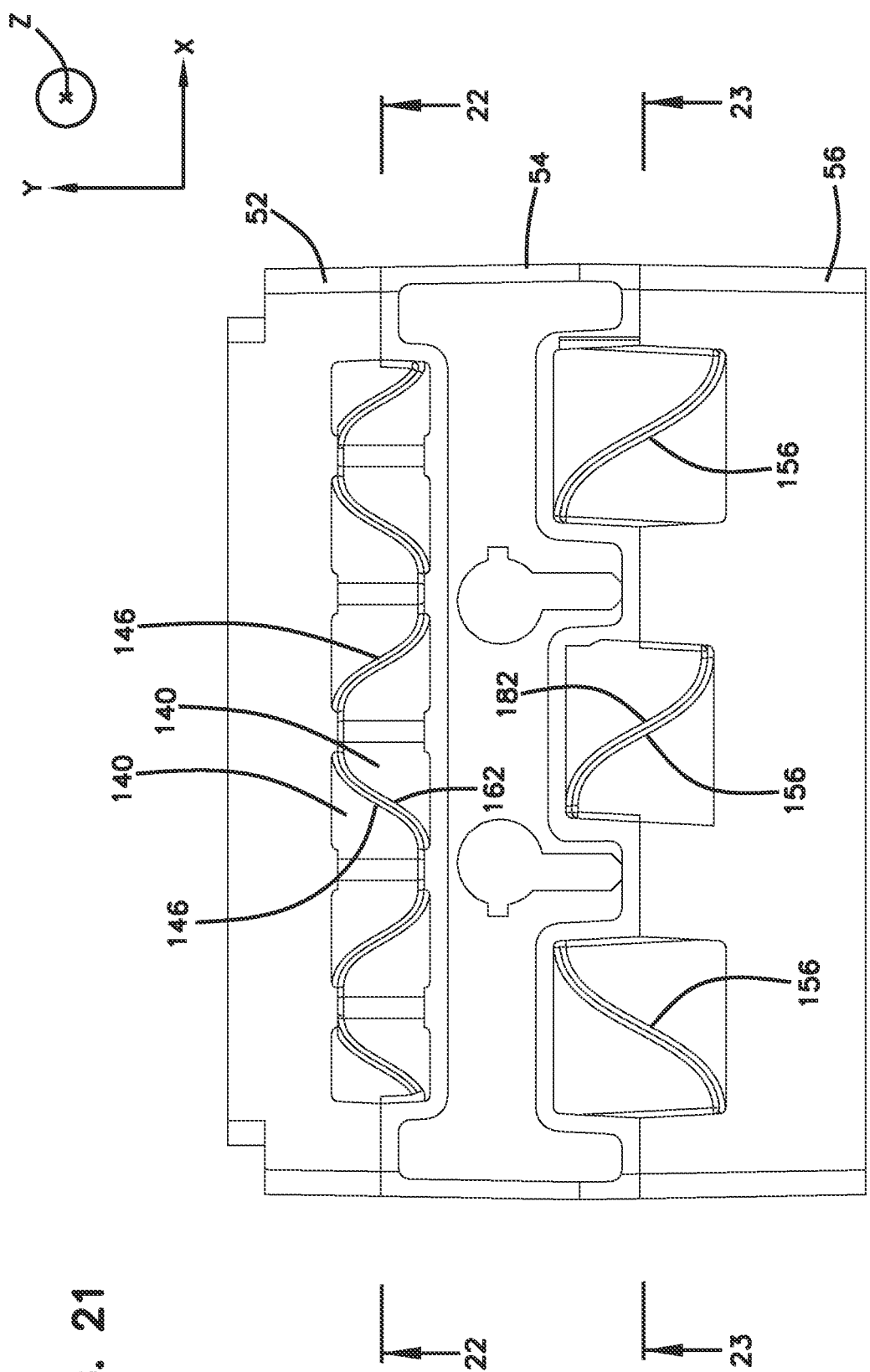
FIG. 21 is an end view of the seal block assembly of FIG. 4.

Referring to FIGS. 21-22, a cable 2 (e.g., a drop cable), enters a cable passage 160 at an outer (or front) cable entry point 162 formed at an interface 146 of a front-most sealing tab pair 140, and exits the cable passage 160 at an inner (or rear) cable entry point 164 formed at an interface 146 of a rear-most sealing tab pair 140. As shown in FIG. 22, the cable 2 defines a reference line.

In some examples, the cable entry points 162, 164 are positioned where the magnitude of the slope of the corresponding interface 146 as projected in an x-y plane is at a maximum. Similarly, in some examples, the cable 2 passes through each of the interfaces 146 along the z-axis at a through-point 166 where the magnitude of the slope of the corresponding interface 146 as projected in an x-y plane is at a maximum. In some examples, including the embodiment depicted, the cable entry points 162 and 164, and cable through points 166 are collinear parallel to the z axis, and equidistant from the main bodies 72 and 120 along a direction parallel to the y axis.

Due to the concavity/convexity of the tabs 74 and the tabs 124 as described above, the introduction of the cable 2 in the corresponding cable passage 160 (FIG. 22) causes the tabs 74 and 124 to deform (not shown) in the directions of the arrows 170, i.e., into the spaces 144 and away from the spaces 145.

Multiple features of the cooperation between the seal blocks 52 and 54 contribute to and/or enhance the sealing of the sealing assembly 50 about the cable 2 when the cable 2 is positioned in the cable passage 160 defined by the coupling of the seal blocks 52 and 54. In some examples, these features, individually and/or in combination, provide a sealing in which there is no or substantially no opening between the cable and the sealing tab pairs 140 at the entry points 162 and 164 and/or the through points 166 along the cable passage 160. In some examples, these features, individually and/or in combination, provide a sealing in which there is one or more small opening between the cable and the sealing tab pairs at one or more of the entry points 162 and 164 and/or the through points 166, but the cable is still sealed to a sufficient degree due to the magnitude of the length and labyrinthine nature of the leak path through such holes along the cable passage 160. Non-limiting examples of these seal contributing and/or enhancing features will now be discussed in turn.

One such seal contributing and/or enhancing feature is the undulating nature of the tabs and gaps of the complementary seal blocks 52 and 54 as projected in x-y planes.

Another such seal contributing and/or enhancing feature is the shape of the undulation, e.g., being sinusoidal, trapezoidal, or substantially sinusoidal or trapezoidal.

Another such seal contributing and/or enhancing feature is the concavity/convexity of the tabs in an x-z plane.

Another such seal contributing and/or enhancing feature is the resilience and other mechanical properties of the tabs.

Another such seal contributing and/or enhancing feature is the spacings 144, 145 between adjacent seal tab pairs along the z direction, which spacings would have to at least partially fill with a contaminant (e.g., water) before such contaminant can pass through the next seal tab pair in the z direction, such that a leak path via the cable channel is labyrinthine as projected in a y-z plane.

Another such seal contributing and/or enhancing feature is the tendency of the tabs to deform towards the larger spacings 144 and away from the smaller spacings 145.

Another such seal contributing and/or enhancing feature is the tendency of the seal tab pairs 140 to deform partially in a direction that is parallel to the z axis when the cable is introduced, which deformation tends to fill locations that would otherwise form openings between the sealing elements and the cable.

Another such seal contributing and/or enhancing feature is the projection of the sealing interfaces in x-y planes being non-parallel to either the x-axis or the y-axis.

Another such seal contributing and/or enhancing feature ("the alternating slope polarity feature" or "ASPF") is the phase difference between sealing interfaces (as projected in an x-y plane) of adjacent tabs along the z direction and the corresponding alternating slope polarity along a given cable passage 160 at the interfaces 146 of the sealing surfaces defined by the seal tab pairs 140.

Figure 24:
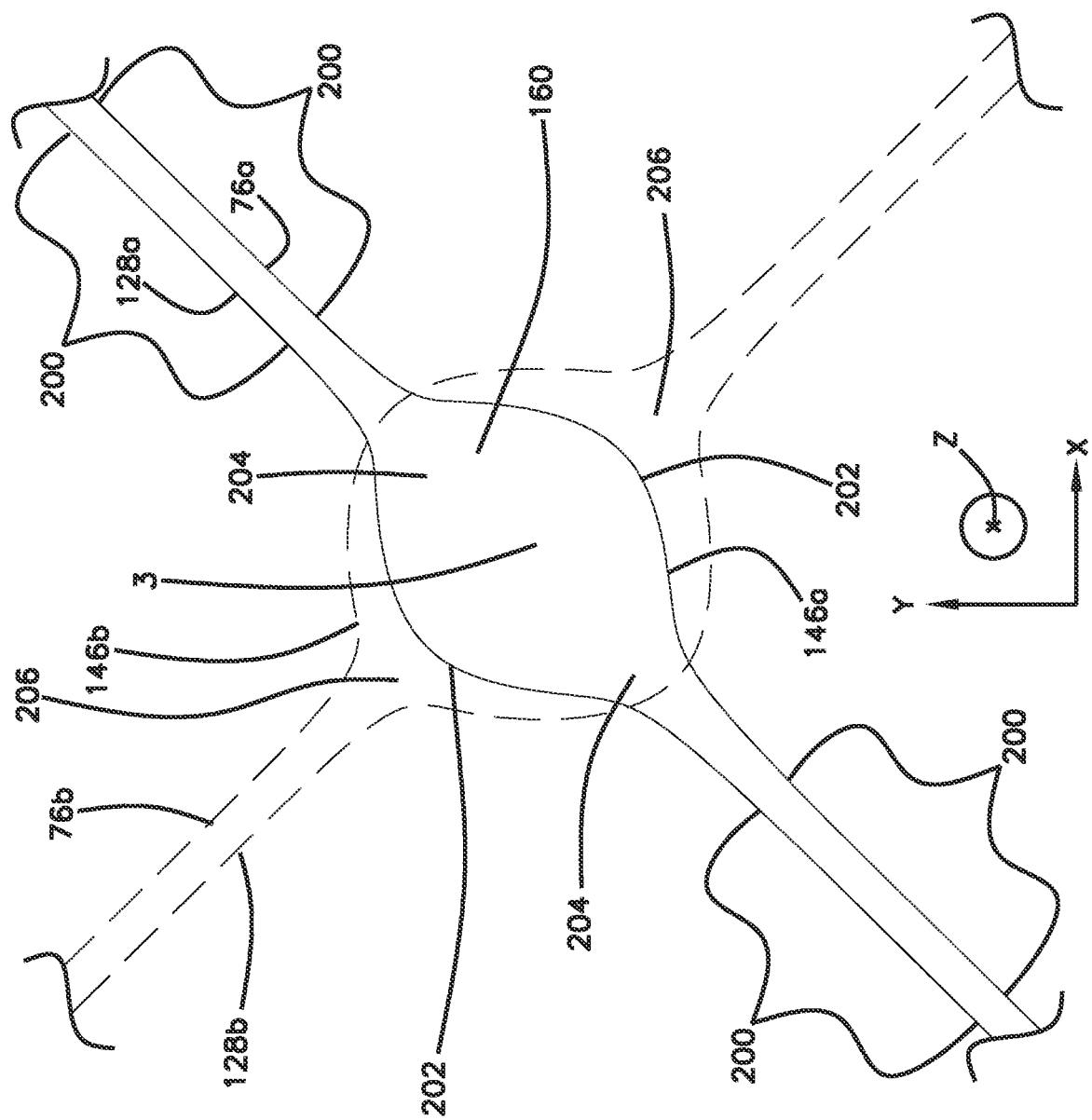
FIG. 24 is a schematic representation of sealing interfaces provided by the seal block assembly of FIG. 4 around a cable.

A schematic representation of the ASPF is illustrated in FIG. 24. A cable (not shown) has a central axis 3 extending into the page along the z axis. The cable extends into the page through a first interface 146a and an adjacent second interface 146b, the second interface 146b being shown in dotted line. The first interface 146a is formed around the cable between sealing surfaces 76a and 128a. Though not shown in order to aid illustration, the sealing surfaces 76a and 128a abut each other in the regions 200 and abut the cable in the regions 202, such that the only openings between the cable and the sealing surfaces 76a and 128a are the small openings 204. In some examples, any openings between the sealing surfaces 76a and 128a are farther away from the cable, e.g., closer to the main body of one of the seal block members. Due to the nature of the tab deflection resulting from the concavity/convexity of the tabs when the cable is introduced, the abutment of the sealing surfaces 76a and 128a to the cable is defined by a plane that is oblique to the cable passage, thus providing a three-dimensional seal about the cable. Such a three-dimensional seal around a cable can be more robust then a two dimensional seal in which the abutment of sealing tabs to the cable is defined by a plane that is perpendicular (i.e., not oblique) to the cable passage. In other examples, the abutment of sealing tabs to the cable provides a two dimensional seal, i.e., an abutment of tabs to cable defined by a plane that is perpendicular to the cable axis.

The second interface 146b is formed around the cable in the same manner as the interface 146a, but rotated in the x-y plane such that the only openings between the cable and the sealing surface 76b and 128b are the small openings 206. In some examples, any openings between the sealing surfaces 76b and 128b are farther away from the cable, e.g., closer to the main body of one of the seal block members. Due to the nature of the tab deflection resulting from the concavity/convexity of the tabs when the cable is introduced, the abutment of the sealing surfaces 76b and 128b is also three-dimensional, i.e., defined by a plane that is oblique to the cable passage. In other examples, the abutment of sealing tabs to the cable provides a two dimensional seal, i.e., an abutment of tabs to cable defined by a plane that is perpendicular to the cable axis.

In addition, the small openings 206 are not aligned in the z direction with the small openings 204, resulting in a labyrinthine leakage path as projected in an x-z plane from the first interface 146a through the second interface 146b. In this example, the slope of the interface of the sealing surfaces 76a and 128a has a positive polarity in the x-y plane, and the slope of the interface of the sealing surfaces 76b and 128b has a negative polarity in the x-y plane.

It should be appreciated, however, that a leakage path having labyrinthine nature as projected in an x-z plane can be provided by simply rotating the adjacent interfaces (along the z direction) to some degree such that their slopes are different without necessarily being of opposite polarity.

It should also be appreciated that one or more of the seal contributing and/or enhancing features just described with respect to the cooperation of the seal blocks 52 and 54, individually or in combination can, in some examples, provide for a cable passage 160 through the seal block assembly and extending in a direction parallel to the z axis whose only leakage path is: labyrinthine as the leakage path is projected in an x-z plane; labyrinthine as the leakage path is projected in a y-z plane; or labyrinthine as the leakage is projected in both x-z and y-z planes, i.e., a three-dimensionally labyrinthine leakage path.

Figure 23:
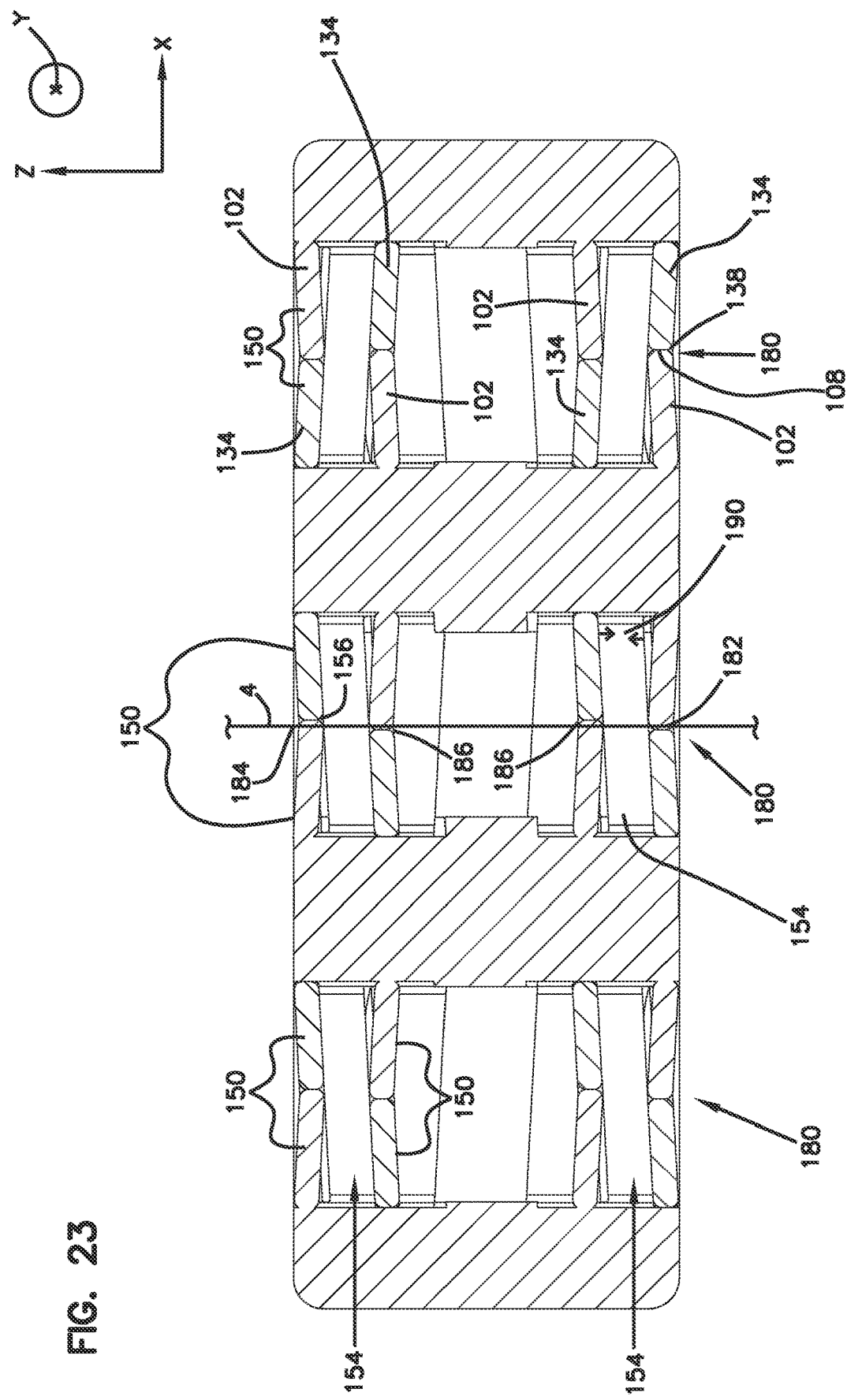
FIG. 23 is a further cross-sectional view of the seal block assembly of FIG. 4 taken along the line 23-23 in FIG. 21, and also including a schematically illustrated feeder cable.

Referring now to FIGS. 21 and 23, with the seal blocks 56 and 54 coupled together, cable passages 180 extending substantially parallel to the z axis are defined. In this example, 3 parallel cable passages 180 are defined, such that coupling of seal blocks 56 and 54 can accommodate and provide sealing for up to 3 (i.e., 0, 1, 2, or 3) cables, assuming one cable per passage 180.

Referring to FIGS. 21 and 23, a cable 4 (e.g., a feeder cable), enters a cable passage 180 at an outer (or front) cable entry point 182 formed at an interface 156 of a front-most sealing tab pair 150, and exits the cable passage 180 at an inner (or rear) cable entry point 184 formed at an interface 156 of a rear-most sealing tab pair 150.

In some examples, the cable entry points 182, 184 are positioned where the magnitude of the slope of the corresponding interface 156 as projected in an x-y plane is at a maximum. Similarly, in some examples, the cable 4 passes through each of the interfaces 156 along the z-axis at a through-point 186 where the magnitude of the slope of the corresponding interface 156 as projected in an x-y plane is at a maximum. In some examples, the cable entry points 182 and 184, and cable through points 186 are collinear or substantially collinear parallel to the z axis, and equidistant from the main bodies 100 and 120 along a direction parallel to the y axis.

Due to the pitch of the tabs 102 and the tabs 134 as described above, the introduction of the cable 4 in the corresponding cable passage 180 as shown in FIG. 23 causes the tabs 102 and 134 to deform in the directions of the arrows 190, i.e., into the spaces 154.

Multiple features of the cooperation between the seal blocks 56 and 54 contribute to and/or enhance the sealing of the sealing assembly 50 about the cable 4 when the cable 4 is positioned in the cable passage 180 defined by the coupling of the seal blocks 56 and 54. In some examples, these features, individually and/or in combination, provide a sealing in which there is no or substantially no opening between the cable and the sealing tab pairs 150 at the entry points 182 and 184 and/or the through points 186 along the cable passage 180. In some examples, these features, individually and/or combination, provide a sealing in which there is one or more small openings between the cable 4 and the sealing tab pairs at one or more of the entry points 182 and 184 and/or the through points 186, but the cable is still sealed to a sufficient degree on account of the long length and labyrinthine nature of the leak path through such holes along the cable passage 180. Non-limiting examples of these seal contributing and/or enhancing features will now be discussed in turn.

One such seal contributing and/or enhancing feature is the undulating nature of the tabs and gaps of the complementary seal blocks 56 and 54 as projected in x-y planes.

Another such seal contributing and/or enhancing feature is the shape of the undulation, e.g., being sinusoidal, trapezoidal, or substantially sinusoidal or trapezoidal.

Another such seal contributing and/or enhancing feature is the non-zero pitch of the tabs as projected in an x-z plane.

Another such seal contributing and/or enhancing feature is the resilience and other mechanical properties of the tabs.

Another such seal contributing and/or enhancing feature is the spacings 154 between adjacent seal tab pairs along a direction parallel to the z axis, which spacings would have to at least partially fill with a contaminant (e.g., water) before such contaminant can pass through the next seal tab pair in the z direction, such that a leak path via the cable channel 180 is labyrinthine as projected in a y-z plane.

Another such seal contributing and/or enhancing feature is the tendency of the tabs to deform in the same direction as one another along the z direction in a given cable passage 180.

Another such seal contributing and/or enhancing feature is the phase difference between sealing interfaces (as projected in an x-y plane) of adjacent tabs along the z direction and the corresponding alternating slope polarity along a given cable passage 180 at the interfaces 156 of the sealing surfaces defined by the seal tab pairs 150.

Another such seal contributing and/or enhancing feature is the tendency of the seal tab pairs 150 to deform partially in a direction that is parallel to the z axis when the cable is introduced, which deformation tends to fill locations that would otherwise form openings between the sealing elements and the cable.

Another such seal contributing and/or enhancing feature is the projection of the sealing interfaces in x-y planes being non-parallel to either the x-axis or the y-axis.

It should be appreciated, however, that a leakage path having labyrinthine nature as projected in an x-z plane can be provided by simply rotating the adjacent interfaces to some degree such that their slopes are different without necessarily being of opposite polarity.

It should also be appreciated that one or more of the seal contributing and/or enhancing features just described with respect to the cooperation of the seal blocks 56 and 54, individually or in combination can, in some examples, provide for cable passage 180 through the seal block assembly and extending in a direction parallel to the z axis whose only leakage path is: labyrinthine as the leakage path is projected in an x-z plane; labyrinthine as the leakage path is projected in a y-z plane; or labyrinthine as the leakage is projected in both x-z and y-z planes, i.e., a three-dimensionally labyrinthine leakage path.

Various modifications and alterations of this disclosure will become apparent to those skilled in the art without departing from the scope and spirit of this disclosure, and it should be understood that the scope of this disclosure is not to be unduly limited to the illustrative examples set forth herein.

What is claimed is:

1. A seal block assembly configured to receive a cable and comprising:
    first and second block members, each of the first and second block members including a main body and a plurality of resilient tabs projecting from the main body, the resilient tabs defining sealing surfaces, the resilient tabs being sized and arranged such that when the first and second block members are coupled to each other:
        the first and second block members define at least one cable passage between a cable entry and a cable exit, a reference line extending through the cable entry and the cable exit;
        the sealing surfaces of the resilient tabs of the first block member abut the sealing surfaces of the resilient tabs of the second block member to form a plurality of sealing tab pairs, the sealing tab pairs being aligned along the reference line between the cable entry and the cable exit; and
        there is a spacing between every adjacent pair of sealing tab pairs along the reference line,
    wherein the sealing tab pairs define sealing interfaces between the sealing surfaces of the resilient tabs; and
    wherein the sealing interfaces of every adjacent pair of sealing tab pairs along the reference line have orientations relative to the reference line that are offset from each other.

2. The seal block assembly of claim 1,
    wherein at least portions of the sealing surfaces are curved; and
    wherein the resilient tabs are sized and arranged such that curved portions of the sealing surfaces of the resilient tabs of the sealing tab pairs abut each other.

3. The seal block assembly of claim 1,
    wherein the resilient tabs are sized and arranged such that the sealing surfaces of the resilient tabs of the sealing tab pairs apply a non-zero force on each other.

4. The seal block assembly of claim 1, wherein the orientations of the sealing interfaces of every adjacent pair of sealing tab pairs along the reference line are offset from each other by at least 45 degrees relative to the reference line.

5. The seal block assembly of claim 1, wherein the orientations of the sealing interfaces of each adjacent pair of sealing tab pairs along the reference line are offset from each other by about 90 degrees relative to the reference line.

6. The seal block assembly of claim 1, wherein the sealing tab pairs define sealing interfaces between the sealing surfaces of the resilient tabs; and
    wherein the sealing interfaces include portions that are non-parallel to a height or width of the seal block assembly.

7. A seal block assembly configured to receive a cable and comprising:
    first and second block members, each of the first and second block members including a main body and a plurality of resilient tabs projecting from the main body, the resilient tabs defining sealing surfaces, the resilient tabs being sized and arranged such that when the first and second block members are coupled to each other:
        the first and second block members define at least one cable passage between a cable entry and a cable exit, a reference line extending through the cable entry and the cable exit;

the sealing surfaces of the resilient tabs of the first block member abut the sealing surfaces of the resilient tabs of the second block member to form a plurality of sealing tab pairs, the sealing tab pairs being aligned along the reference line between the cable entry and the cable exit; and there is a spacing between every adjacent pair of sealing tab pairs along the reference line, wherein at least one of the sealing tab pairs projects partially towards the cable entry and partially away from the cable exit; and wherein at least one of the sealing tab pairs projects partially towards the cable exit and partially away from the cable entry.

8. The seal block assembly of claim 7, wherein for each adjacent pair of sealing tab pairs along the reference line, one of the sealing tab pairs projects at least partially towards the cable entry and partially away from the cable exit, and the other of the sealing tab pairs projects partially towards the cable exit and partially away from the cable entry.

9. The seal block assembly of claim 1, wherein at least a first of the sealing tab pairs has a concavity facing a first direction parallel to the reference line, and wherein at least a second of the sealing tab pairs has a concavity facing a second direction that is opposite the first direction.

10. The seal block assembly of claim 1, wherein the seal block assembly defines a plurality of the cable passages arranged parallel to one another.

11. The seal block assembly of claim 10, wherein the seal block assembly defines at least three of the cable passages.

12. The seal block assembly of claim 1, wherein there is no leak path through the cable passage when there is no object inserted in the cable passage.

13. The seal block assembly of claim 1, wherein there is no leak path through the cable passage when there is a cable inserted in the cable passage.

14. The seal block assembly of claim 1,
wherein the sealing tab pairs define sealing interfaces between the sealing surfaces of the resilient tabs; and
wherein projections of the sealing interfaces on a reference plane are at least partially sinusoidal.

15. The seal block assembly of claim 1, wherein the spacings are large enough such that adjacent pairs of sealing tab pairs parallel to the reference line do not touch each other when a cable is provided in the cable passage.

16. The seal block assembly of claim 1, wherein when a cable is provided in the cable passage, an abutment of at least one of the sealing tab pairs with the cable is defined by a plane that is oblique to the reference line, thereby providing a three-dimensional seal around the cable.

17. A telecommunications closure comprising:
a re-enterable housing defining a closure volume; and
the seal block assembly of claim 1, each of the at least one cable passage at least partially defining a port through which a cable can enter the closure volume.

18. The telecommunications closure of claim 17, wherein the closure is rated for ingress protection level IP 54 or higher.

19. The telecommunications closure of claim 17, wherein the closure is rated for ingress protection level IP 55 or higher.

20. The telecommunications closure of claim 17, wherein the closure is rated for ingress protection level IP 65 or higher.

21. A seal block assembly configured to receive a cable and comprising:

first and second block members, each of the first and second block members including a main body and a plurality of resilient tabs projecting from the main body, the resilient tabs defining sealing surfaces, the resilient tabs being sized and arranged such that when the first and second block members are coupled to each other:
the first and second block members define at least one cable passage between a cable entry and a cable exit, a reference line extending through the cable entry and the cable exit;
the sealing surfaces of the resilient tabs of the first block member abut the sealing surfaces of the resilient tabs of the second block member to form a plurality of sealing tab pairs, the sealing tab pairs being aligned along the reference line between the cable entry and the cable exit; and
there is a spacing between every adjacent pair of sealing tab pairs along the reference line,
wherein the seal block assembly defines a leak path when a cable is positioned in the cable passage, the leak path being labyrinthine as projected in at least one reference plane.

22. The seal block assembly of claim 21, wherein the leak path is labyrinthine as projected in each of two mutually perpendicular reference planes.

23. A seal block assembly configured to receive a cable and comprising:
first and second block members, each of the first and second block members including a main body and a plurality of resilient tabs projecting from the main body, the resilient tabs defining sealing surfaces, the resilient tabs being sized and arranged such that when the first and second block members are coupled to each other:
the first and second block members define at least one cable passage between a cable entry and a cable exit, a reference line extending through the cable entry and the cable exit;
the sealing surfaces of the resilient tabs of the first block member abut the sealing surfaces of the resilient tabs of the second block member to form a plurality of sealing tab pairs, the sealing tab pairs being aligned along the reference line between the cable entry and the cable exit; and
there is a spacing between every adjacent pair of sealing tab pairs along the reference line, the seal block assembly further comprising:
a third block member, the third block member including a main body and a plurality of resilient tabs projecting from the main body of the third block member, the resilient tabs defining sealing surfaces, the resilient tabs being sized and arranged such that when the third and second block members are coupled to each other:
the third and second block members define at least one cable passage between a cable entry and a cable exit, a reference line extending through the cable entry and the cable exit;
the sealing surfaces of the resilient tabs of the third block member abut the sealing surfaces of the resilient tabs of the second block member to form a plurality of sealing tab pairs, the sealing tab pairs being aligned along the reference line between the cable entry and the cable exit; and
there is a spacing between every adjacent pair of sealing tab pairs along the reference line.

24. The seal block assembly of claim 23, wherein the at least one cable passage defined by the third and second block members is adapted to seal around a thicker cable than the at least one cable passage defined by the first and second block members.

\* \* \* \* \*